(12) United States Patent
Sugimoto et al.

(10) Patent No.: US 9,275,319 B2
(45) Date of Patent: Mar. 1, 2016

(54) ELECTRIC POWER SYSTEM AND IMAGE FORMING APPARATUS

(71) Applicant: BROTHER KOGYO KABUSHIKI KAISHA, Nagoya-shi, Aichi-ken (JP)

(72) Inventors: Tasuku Sugimoto, Nagoya (JP); Yoshiyuki Tsujimoto, Nagoya (JP); Nobuyuki Tanaka, Konan (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/665,936

(22) Filed: Mar. 23, 2015

(65) Prior Publication Data

US 2015/0278666 A1 Oct. 1, 2015

(30) Foreign Application Priority Data

Apr. 1, 2014 (JP) ................................. 2014-075473

(51) Int. Cl.
| | |
|---|---|
| *G06F 15/00* | (2006.01) |
| *G06K 15/00* | (2006.01) |
| *G06K 15/14* | (2006.01) |
| *H02M 3/335* | (2006.01) |

(52) U.S. Cl.
CPC ............ *G06K 15/4055* (2013.01); *G06K 15/14* (2013.01); *H02M 3/33507* (2013.01)

(58) Field of Classification Search
CPC .................................................. H02M 3/33507
See application file for complete search history.

(56) References Cited

U.S. PATENT DOCUMENTS

| | | | |
|---|---|---|---|
| 4,058,758 | A | 11/1977 | Peterson |
| 4,755,922 | A | 7/1988 | Puvogel |
| 5,416,689 | A | 5/1995 | Silverstein et al. |
| 5,424,933 | A | 6/1995 | Illingworth |
| 5,880,942 | A | 3/1999 | Leu |
| 5,914,538 | A | 6/1999 | Kurosawa et al. |
| 6,088,243 | A | 7/2000 | Shin |

(Continued)

FOREIGN PATENT DOCUMENTS

| | | |
|---|---|---|
| EP | 2 450 750 A2 | 5/2012 |
| EP | 2 451 067 A2 | 5/2012 |

(Continued)

OTHER PUBLICATIONS

European Search Report issued in related Application No. 13 18 6173.4, mailed Jun. 3, 2015.

(Continued)

*Primary Examiner* — Saeid Ebrahimi Dehkordy
(74) *Attorney, Agent, or Firm* — Merchant & Gould PC

(57) ABSTRACT

An electric power system includes: a switching power supply converting an AC into a DC and operating in an on mode and an off mode; a power supply control unit activated when electric power is supplied from the AC power supply, and the power supply control unit being configured to control an oscillation operation of the switching power supply according to the mode designation signal; a mode control unit generating the mode designation signal; and an auxiliary power supply configured to supply electric power to the mode control unit when the switching power supply does not oscillate. In one of the on mode and off mode, the mode control unit performs outputs a consecutive-pulse signal to the power supply control unit. In the other mode, the mode control unit performs a restriction process of restricting output of the consecutive-pulse signal.

15 Claims, 18 Drawing Sheets

(56) References Cited

U.S. PATENT DOCUMENTS

| | | |
|---|---|---|
| 6,104,622 A | 8/2000 | Shin |
| 6,728,117 B2 | 4/2004 | Schemmann et al. |
| 6,952,355 B2 | 10/2005 | Riggio et al. |
| 7,161,815 B2 | 1/2007 | Mori |
| 7,355,867 B2 | 4/2008 | Shuey |
| 7,577,003 B2 | 8/2009 | Nakamura |
| 7,719,860 B2 | 5/2010 | Usui |
| 7,746,672 B2 | 6/2010 | Nishikawa |
| 7,957,162 B2 | 6/2011 | Choi et al. |
| 2002/0089862 A1 | 7/2002 | Amei |
| 2004/0145924 A1 | 7/2004 | Jang et al. |
| 2005/0078492 A1 | 4/2005 | Takahashi |
| 2008/0259659 A1 | 10/2008 | Choi et al. |
| 2009/0237050 A1 | 9/2009 | Yamada et al. |
| 2010/0135050 A1 | 6/2010 | Sonobe |
| 2010/0244804 A1 | 9/2010 | Zong et al. |
| 2011/0096572 A1 | 4/2011 | Liang et al. |
| 2011/0103103 A1 | 5/2011 | Zhan et al. |
| 2011/0175587 A1 | 7/2011 | Hosotani |
| 2012/0027447 A1 | 2/2012 | Mukaibara |
| 2012/0027448 A1 | 2/2012 | Mukaibara |
| 2012/0049823 A1 | 3/2012 | Chen |
| 2012/0113685 A1 | 5/2012 | Inukai |
| 2012/0114363 A1 | 5/2012 | Inukai |
| 2012/0250365 A1 | 10/2012 | Matsumoto |
| 2013/0057875 A1 | 3/2013 | Hotogi et al. |
| 2013/0108303 A1 | 5/2013 | Samejima et al. |
| 2013/0134892 A1 | 5/2013 | Kado et al. |
| 2013/0164016 A1 | 6/2013 | Inukai |
| 2013/0236206 A1* | 9/2013 | Shoji .................... G03G 15/80 399/88 |
| 2013/0257409 A1 | 10/2013 | Komiya |
| 2014/0186067 A1 | 7/2014 | Inukai |

FOREIGN PATENT DOCUMENTS

| | | |
|---|---|---|
| JP | 7-87734 A | 3/1995 |
| JP | 11-103541 A | 4/1999 |
| JP | 2000-270546 A | 9/2000 |
| JP | 2002-125368 A | 4/2002 |
| JP | 2005-218168 A | 8/2005 |
| JP | 2012-105378 A | 5/2012 |
| JP | 2014-131419 A | 7/2014 |

OTHER PUBLICATIONS

U.S. Office Action for related U.S. Appl. No. 14/040,009 mailed Dec. 18, 2014.

Office Action issued in related Chinese Search Report issued in related Chinese application No. 201310459661.6, mailed Oct. 28, 2015.

* cited by examiner

ELECTRIC POWER SYSTEM AND IMAGE FORMING APPARATUS

CROSS REFERENCE TO RELATED APPLICATION

This application is based upon and claims the benefit of priority of Japanese Patent Application No. 2014-075473 filed on Apr. 1, 2014, the contents of which are incorporated herein by reference in its entirety.

BACKGROUND

The present disclosure relates to an electric power system and an image forming apparatus having the electric power system, and more specifically, to a technology for controlling an oscillation operation of a switching power supply of a power supply according to a pulse signal.

In the related art, a technology for controlling an oscillation operation of a switching power supply of a power supply according to a pulse signal is known. In such a related art, a switch control unit is provided so as to control oscillation of a switching power supply according to a control pulse signal which is supplied from a mode control block (a power supply key control IC), and stops the output of the switching power supply according to the control pulse signal.

If disturbance noise is generated, for example, during an operation of an electric power system, it is feared that the switch control unit (power supply control IC) may mistakenly recognize the disturbance noise as a control pulse signal for switching the oscillation operation, and stop the oscillation of the switching power supply.

SUMMARY

An object of an aspect of the present disclosure is to provide a technology for suppressing failures from being caused by disturbance noise in an electric power system in which an oscillation operation of a switching power supply is switched by a pulse signal.

The aspect of the present disclosure provides the following arrangements:

An electric power system comprising:
a switching power supply configured to receive an AC voltage from an AC power supply, convert the AC voltage into a DC voltage, and output the DC voltage, the switching power supply being configured to operate in an operation mode including an on mode in which the switching power supply oscillates and an off mode in which the switching power supply does not oscillate;
a power supply control unit configured to be activated when electric power is supplied from the AC power supply to the power supply control unit, the power supply control unit including a mode designation terminal configured to receive a mode designation signal designating the operating mode of the switching power supply, and the power supply control unit being configured to control an oscillation operation of the switching power supply according to the mode designation signal;
a mode control unit configured to generate the mode designation signal; and
an auxiliary power supply configured to supply electric power to the mode control unit when the switching power supply does not oscillate,
wherein in a period of one of the on mode and the off mode, the mode control unit performs an outputting process of outputting, as the mode designation signal, a consecutive-pulse signal in which pulses continues in a predetermined cycle to the mode designation terminal of the power supply control unit, and
wherein in the period of the other of the on mode and the off mode, the mode control unit performs a restriction process of restricting output of the consecutive-pulse signal.

An electric power system comprising:
a switching power supply configured to receive an AC voltage from an AC power supply, and convert the AC voltage into a DC voltage, and output the DC voltage, the switching power supply being configured to operate in an operation mode including an on mode in which the switching power supply oscillates and an off mode in which the switching power supply does not oscillate;
a power supply control unit configured to be activated when electric power is supplied from the AC power supply to the power supply control unit, the power supply control unit including a mode designation terminal configured to receive a mode designation signal designating the operating mode of the switching power supply, and the power supply control unit being configured to control an oscillation operation of the switching power supply according to the mode designation signal;
a mode control unit configured to generate the mode designation signal;
an auxiliary power supply configured to supply electric power to the mode control unit when the switching power supply does not oscillate;
a power supply information generating circuit configured to generate power supply information representing whether the switching power supply is oscillating or not; and
a storage unit configured to store mode information representing the operating mode of the switching power supply,
wherein in a case that the storage unit contains the mode information representing the on mode, the power supply information representing that the switching power supply is oscillating is generated, the mode control unit performs a determining process of determining that the switching power supply is in a normal state when the power supply information generating circuit generates the power supply information representing that the switching power supply is oscillating,
wherein in the case that the storage unit contains the mode information representing the on mode, the mode control unit performs the determining process of determining that the switching power supply is in an abnormal state when the power supply information generating circuit generates the power supply information representing that the switching power supply is not oscillating, and
wherein when the determining process determines that the switching power supply is in the abnormal state, the mode control unit performs an abnormal outputting process in which the mode designation signal designating the on mode is output as the mode designation signal to the mode designation terminal.

An electric power system comprising:
a switching power supply configured to receive an AC voltage from an AC power supply, and convert the AC voltage into a DC voltage, and output the DC voltage, the switching power supply being configured to operate in an operation mode including an on mode in which the switching power supply oscillates and an off mode in which the switching power supply does not oscillate;
a power supply control unit configured to be activated when electric power is supplied from the AC power supply to the power supply control unit, the power supply control unit including a mode designation terminal configured to receive a mode designation signal designating the operating mode of the switching power supply, and the power supply control unit being configured to control an oscillation operation of the switching power supply according to the mode designation signal;

a mode control unit configured to generate the mode designation signal;

an auxiliary power supply configured to supply electric power to the mode control unit when the switching power supply does not oscillate; and a storage unit configured to store mode information representing the operating mode of the switching power supply, wherein in a case where the switching power supply is oscillating, the power supply control unit performs a change notifying process of transmitting an off mode switch signal to the mode control unit when the designation signal designating the off mode is input as the mode designation signal to the mode designation terminal, and wherein the mode control unit performs an off mode storing process of storing mode information representing the off mode in the storage unit when the off mode switch signal is input.

DESCRIPTION OF ILLUSTRATIVE EMBODIMENTS

First Embodiment

A first embodiment will be described with reference to FIGS. 1 to 13.

1. Description of Printer

Figure 1:
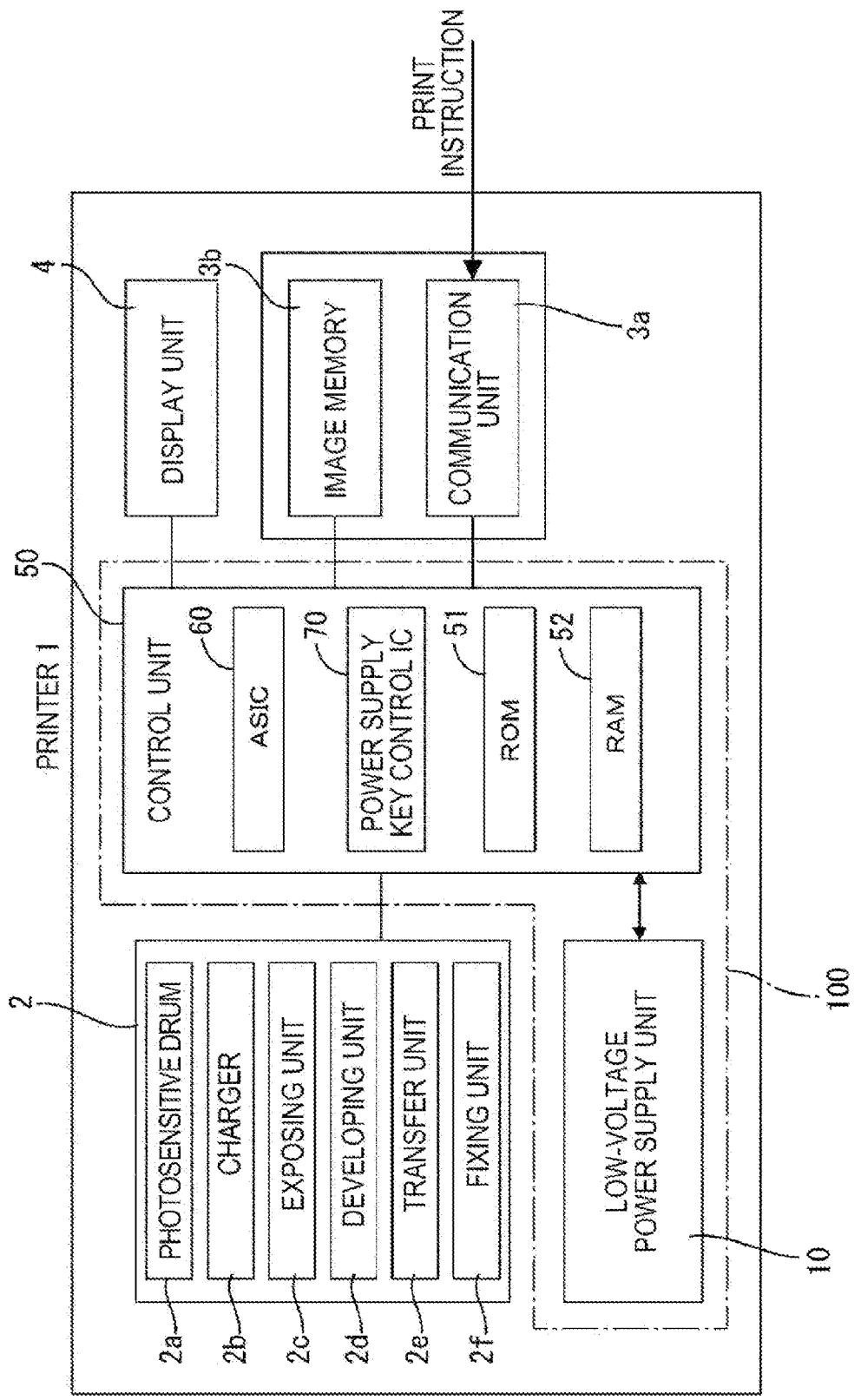
FIG. 1 is a block diagram schematically illustrating a configuration of an image forming apparatus according to a first embodiment.

As shown in FIG. 1, a printer 1 which is an example of an image forming apparatus includes a printing unit 2, a communication unit 3a, an image memory 3b, a display unit 4, and an electric power system 100. The electric power system 100 includes a low-voltage power supply unit 10 and a control unit 50. The low-voltage power supply unit 10 serves as a power supply for the printer 1, and supplies electric power to the printing unit 2, the communication unit 3a, the image memory 3b, and the control unit 50. Also, the image forming apparatus is not limited to a printer, and may be any other apparatus such as a copy machine, a scanner, or a multifunction apparatus.

The printing unit 2 includes a photosensitive drum 2a, a charger 2b which performs a charging process of charging the surface of the photosensitive drum 2a, an exposing unit 2c which performs an exposing process of forming an electrostatic latent image on the surface of the photosensitive drum 2a, a developing unit 2d which performs a developing process of applying developer on the electrostatic latent image, thereby forming a developer image, a transfer unit 2e which performs a transferring process of transferring the developer image onto a recording medium, a fixing unit 2f which performs a fixing process of fixing the transferred developer image on the recording medium, and so on.

The printing unit 2 performs a charging process, an exposing process, a developing process, a transferring process, and a fixing process, thereby performing a printing process of printing print data on a recording medium. The communication unit 3a performs communication with information terminal apparatuses such as a PC, and takes charge of a function of receiving print instructions and print data from information terminal apparatuses. The image memory 3b temporarily stores print data received from information terminal apparatuses.

In the above described printer 1, if the communication unit 3a receives a print instruction from an information terminal apparatus, thereby receiving print data, the control unit 50 controls the printing unit 2 such that the printing unit 2 performs printing processes each of which is composed of a charging process, an exposing process, a developing process, a transferring process, and a fixing process, thereby printing the print data on recording media. Also, the operating voltage of the printing unit 2 is mostly 24 V, whereas the operating voltages of the communicating unit 3a, the image memory 3b, and the control unit 50 are mostly 3.3 V.

Also, the printer 1 has an ON mode and an OFF mode as operating modes. The ON mode is a mode which is set if a user presses a power supply key SW1 (see FIG. 2) in the OFF mode. As will be described below in detail, the ON mode is a mode in which a switching power supply 20 of the electric power system 100 operates, and includes a ready mode, a print mode, and a sleep mode. The ready mode is a mode in which the printer 1 can immediately perform a printing process in response to a print instruction. Therefore, in the ready mode, supply of electric power to the fixing unit 2f, particularly, the heater of the fixing unit 2f is controlled such that it is maintained at a temperature at which fixing is possible, or a temperature slightly lower than the temperature at which fixing is possible. The print mode is a mode in which the printer 1 receives printing instructions whereby the printing unit 2 operates. Therefore, in the print mode, supply of electric power to the heater of the fixing unit 2f is controlled such that the heater is maintained at the temperature at which fixing is possible.

Also, the sleep mode is a mode which is set if any printing instruction is not received for a predetermined time from completion of a printing process and in which the printer 1 is in a standby state. In the sleep mode, electric power is not supplied to the heater of the fixing unit 2f. Therefore, the sleep mode saves more electric power than the print mode or the ready mode. Also, the OFF mode is a mode which is set if the user presses the power supply key SW1 (see FIG. 2) in the ON mode. In OFF mode, electric power is not supplied to the heater of the fixing unit 2f, and the switching power supply 20 of the electric power system 100 does not operate as will be described below in detail. Therefore, the OFF mode saves more electric power than the sleep mode.

2. Configuration of Electric Power System

The configuration of the electric power system 100 will be described with reference to FIG. 2. The electric power system 100 includes the low-voltage power supply unit 10 and the control unit 50, and the low-voltage power supply unit 10 includes the switching power supply 20 and a low-capacity power supply 30.

2-1. Configuration of Low-Voltage Power Supply Unit

First, the configuration of the low-voltage power supply unit 10 including the switching power supply 20 and the low-capacity power supply 30 will be described with reference to FIG. 2.

2-1-1. Configuration of Switching Power Supply

The switching power supply 20 includes a rectifying/smoothing circuit 21, a power supply control IC 22, a voltage generating circuit 23, a transformer 24, a field effect transistor (FET) Q1, a rectifying/smoothing circuit 25, a voltage detecting circuit 26, and DC to DC converters 27 and 28. The switching power supply 20 has an ON mode in which the primary side of the transformer 24 oscillates and an OFF mode in which the primary side does not oscillate, as operating modes.

In this case, in the ON mode of the switching power supply 20, the primary side of the transformer 24 oscillates, whereby the switching power supply 20 produces outputs. In the ready mode and the print mode, DC voltages of 24 V, 5 V, and 3.3 V are output, and in the sleep mode, DC voltages of 5 V and 3.3 V are output.

Meanwhile, in the OFF mode, the transformer 24 does not oscillate, and thus the switching power supply 20 does not produce outputs.

The switching power supply 20 rectifies and smoothes an AC voltage Vac of an AC power supply AC. In the ON mode, in a case where the printer 1 is in the ready mode or the print mode, the switching power supply 20 generates DC voltages of +24 V, +5 V, and +3.3 V, and in a case where the printer 1 is in the sleep mode, the switching power supply 20 outputs +6 V instead of +24 V, and generates DC voltages of +5 V and +3.3 V. The DC voltages of +24 V and +6 V (hereinafter, referred to as DC 24 V and DC 6 V, respectively) are output to a first output terminal OUT1, and the DC voltage of +5 V (hereinafter, referred to as DC 5 V) is output to a second output terminal OUT2, and the DC voltage of +3.3 V (hereinafter, referred to as DC 3.3 V) is output to a third output terminal OUT3. Meanwhile, in the OFF mode, any DC voltage is not output.

The rectifying/smoothing circuit 21 includes a bridge diode which rectifies the AC voltage (for example, 240V) Vac of the AC power supply AC, and a capacitor which smoothes the rectified voltage. The output of the rectifying/smoothing circuit 21 is applied to a primary coil of the transformer 24.

The transistor Q1 is an N-channel MOSFET, and is turned on and off according to an ON/OFF signal (a PWM signal) which is applied from an output terminal OUT of the power supply control IC 22 to the gate of the transistor Q1. As a result, the primary side of the transformer 24 oscillates, whereby a voltage is induced in the secondary coil of the transformer 24.

Moreover, on the primary side of the transformer 24, the voltage generating circuit 23 is provided. The voltage generating circuit 23 rectifies and smoothes a voltage induced in an auxiliary coil provided on the primary side of the transformer 24, thereby generating a power supply voltage Vcc for the power supply control IC 22.

The rectifying/smoothing circuit 25 rectifies and smoothes the voltage induced in the secondary coil of the transformer 24, thereby generating DC 24 V.

The voltage detecting circuit 26 includes a photocoupler PC1, and controls a light emitting diode LED1 of the photocoupler PC1 in response to the detected level of the output of DC 24 V of the switching power supply 20 such that the light emitting diode LED1 emits light. The photocoupler PC1 includes a phototransistor PT1 connected to a feedback port FB of the power supply control IC 22. Therefore, a light signal of the light emitting diode LED1 is converted into an electric signal by the phototransistor PT1, and the detected value of the output of DC 24 V is fed back to the feedback port FB of the power supply control IC 22.

The DC to DC converter 27 converts DC 24 V into DC 5 V and outputs DC 5 V, and the DC to DC converter 28 converts DC 24 V into DC 3.3 V and outputs DC 3.3 V.

Figure 2:
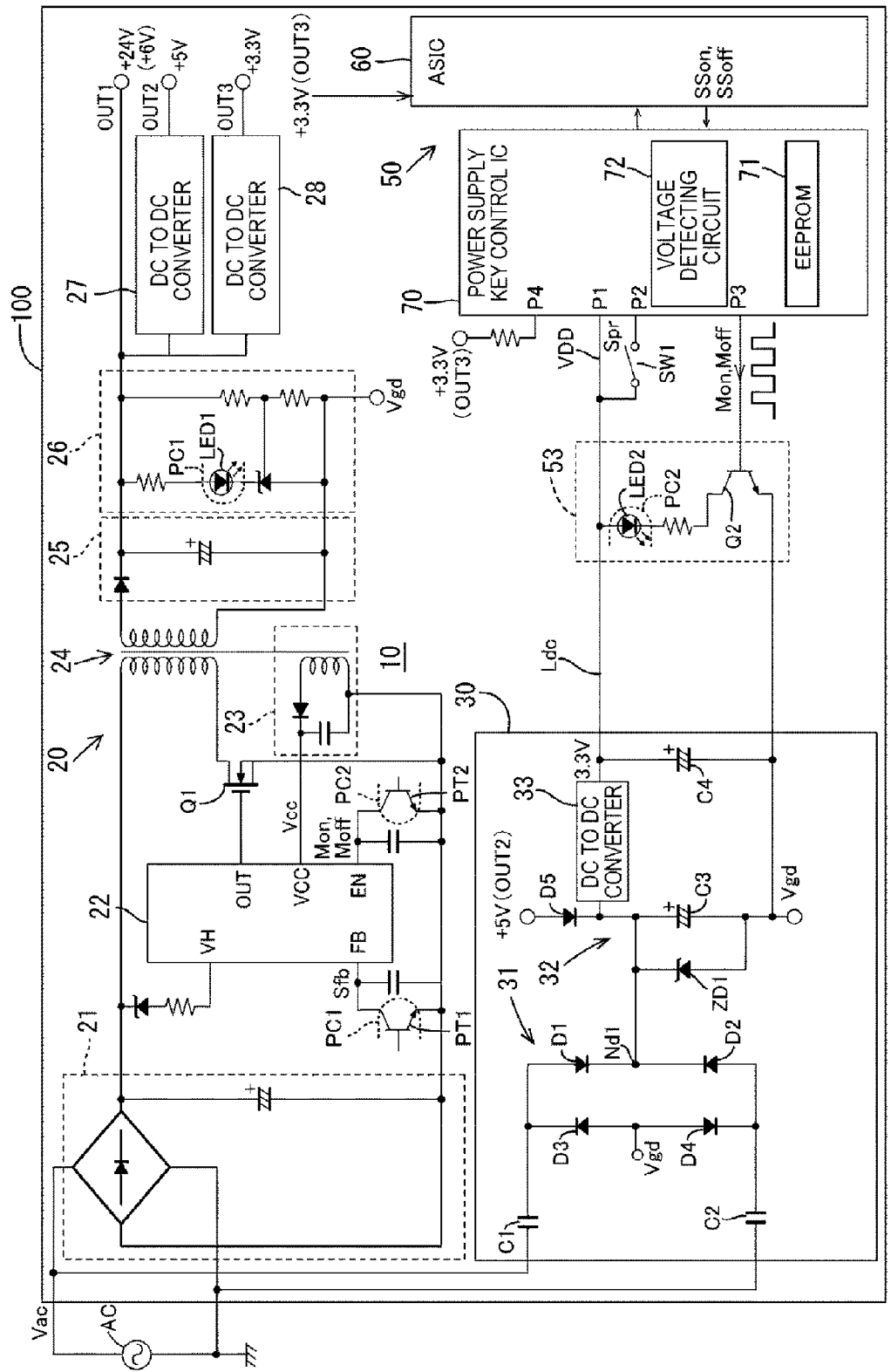
FIG. 2 is a circuit diagram illustrating a configuration of an electric power system which is included in the image forming apparatus.
Figure 3:
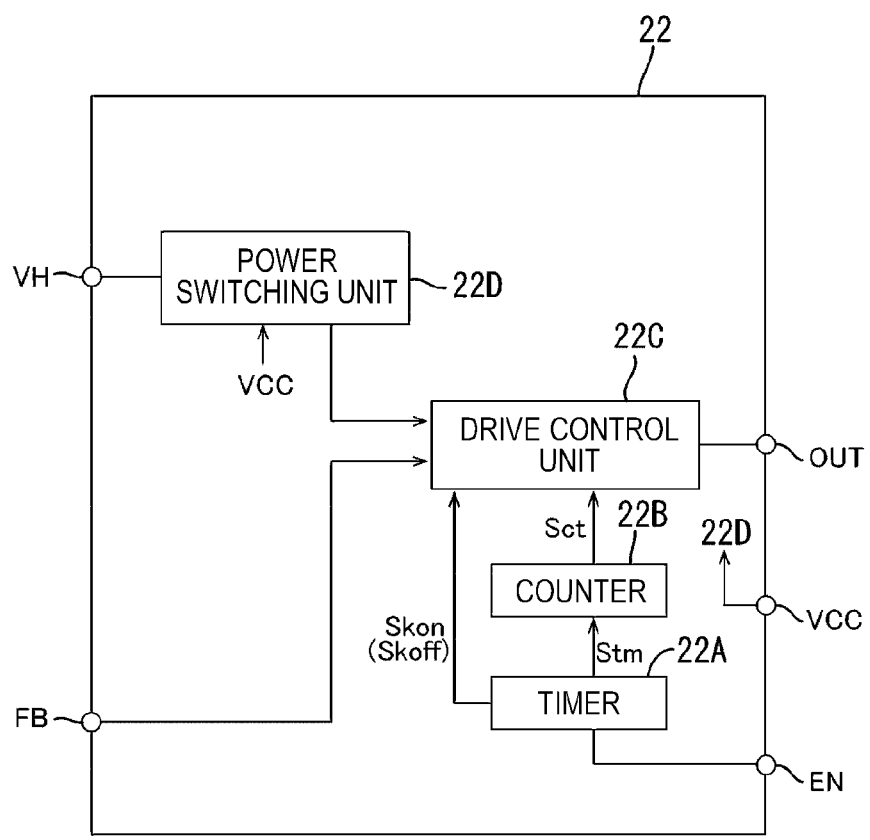
FIG. 3 is a block diagram schematically illustrating a configuration of a control IC.

As shown in FIGS. 2 and 3, the power supply control IC (an example of a power supply control unit) 22 includes a timer 22A, a counter 22B, a drive control unit 22C, a power switching unit 22D, and so on. If electric power is supplied from the AC power supply AC, the power supply control IC 22 is activated. Thereafter, if an ON mode signal (an example of a mode designation signal or an ON mode designation signal) Mon designating the ON mode or an OFF mode signal (an example of the mode designation signal or an OFF mode designation signal) Moff designating the OFF mode is input from a power supply key control IC 70 (to be described below) to an enable terminal (an example of a mode designation terminal) EN, the power supply control IC 22 controls the oscillation operation of the switching power supply 20 according to the input signal. That is, in a case where the ON mode signal Mon is input, the power supply control IC 22 oscillates the switching power supply 20. Meanwhile, in a case where the OFF mode signal Moff is input, the power supply control IC 22 stops oscillation of the switching power supply 20.

Also, in the present embodiment, the OFF mode signal Moff is generated as a consecutive-pulse signal with a predetermined cycle. Also, the ON mode signal Mon is generated as a signal which is obtained by restricting the consecutive-pulse signal. In the present embodiment, the ON mode signal Mon is generated as a signal which is obtained by halting the consecutive-pulse signal, that is, as a signal which is maintained at a low level (see FIG. 8).

The timer (an example of a timer) 22A is connected to the enable terminal EN, and measures a time interval between pulses in response to input of the OFF mode signal Moff which is a consecutive-pulse signal. Whenever a time interval is measured, the timer 22A generates a time measurement signal Stm, and supplies the time measurement signal Stm to the counter 22B. Also, the timer 22A measures the low level time of the enable terminal EN. If the low level time reaches a predetermined time, the timer 22A generates an ON time measurement signal Skon representing input of the ON mode signal Mon, and supplies the ON time measurement signal Skon to the drive control unit 22C.

In this case, when a predetermined period elapses after a pulse with a very short high-level period is input to the enable terminal EN, if a pulse is input to the enable terminal EN again, the time measurement signal Stm is generated. Also, after a signal at a low level is input to the enable terminal EN, if the signal is maintained at the low level until an ON mode signal confirmation period Kon elapses, an ON time measurement signal Skon is generated. That is, the timer 22A measures an ON mode signal confirmation period Kon in which the signal at the low level is maintained (see FIG. 8). The ON mode signal confirmation period Kon is for confirming that the signal input to the enable terminal EN is the ON mode signal Mon. The ON mode signal confirmation period Kon is longer than the pulse cycle of the OFF mode signal Moff.

The counter (an example of a counter) 22B counts the number of pulses which is input to the enable terminal EN in the predetermined cycle, on the basis of the time measurement signal Stm. If the count value reaches a predetermined value, the counter 22B generates a count signal Sct, and supplies the count signal Sct to the drive control unit 22C. Specifically, in the present embodiment, when counting the number of pulses, the counter 22B counts the risings of the pulses. In the present embodiment, the timing when the count signal Sct is generated is the same as a timing after an OFF mode signal confirmation period Koff from a count start time (see FIG. 8 or the like). The OFF mode signal confirmation period Koff is for confirming that the signal input to the enable terminal EN is the OFF mode signal Moff.

Also, the timer 22A and the counter 22B may not be configured separately, and may be configured as a single timer counter. Alternatively, the drive control unit 22C may have a timer and a counter.

The drive control unit 22C is connected to the timer 22A, the counter 22B, the feedback port FB, and the output terminal OUT, and outputs the ON/OFF signal (the PWM signal) to the gate G of the FET Q1 in response to an input signal, thereby controlling switching of the FET.

Specifically, in response to the ON time measurement signal Skon which is input from the timer 22A, the drive control unit 22C outputs the PWM signal to the gate G of the FET, thereby oscillating the switching power supply 20 such that the switching power supply is switched to the ON mode. Also, in response to the count signal Sct which is input from the counter 22B, the drive control unit 22C stops output of the PWM signal to the gate G of the FET, thereby stopping the oscillation of the switching power supply 20 such that the switching power supply is switched to the OFF mode. Further, the drive control unit 22C determines the PWM value of the PWM signal on the basis of a feedback signal Sfb input to the feedback port FB, and performs PWM control on the FET on the basis of the determined PWM value.

The power switching unit 22D switches electric power of the inside of the power supply control IC 22 between electric power from a high-voltage input terminal VH and electric power from an power supply terminal VCC. That is, while a voltage from the power supply terminal VCC rises to a predetermined level, for example, DC 5 V, electric power from the high-voltage input terminal VH is used, and after the voltage from the power supply terminal VCC reaches the predetermined level, switching to electric power from the power supply terminal VCC is performed.

2-1-2. Configuration of Low-Capacity Power Supply

The low-capacity power supply (an example of an auxiliary power supply) 30 has power supply capacity lower than that of the switching power supply 20, and supplies electric power to the power supply key control IC 70 and a mode signal transmitting unit 53 regardless of the operating mode of the switching power supply 20.

The low-capacity power supply 30 includes a first capacitor C1, a second capacitor C2, a smoothing circuit 32, a DC to DC converter 33, and a storage capacitor C4. That is, the low-capacity power supply 30 is a capacitor insulation type low-capacity power supply including the first capacitor C1 and the second capacitor C2.

The first capacitor C1 is connected between one end of the AC power supply AC and a rectifier circuit 31, and the second capacitor C2 is connected between the other end of the AC power supply AC and the rectifier circuit 31.

The rectifier circuit 31 is configured by a bridge circuit which is composed of four diodes D1 to D4. The anode of the diode D1 is connected to the first capacitor C1, and the anode of the diode D2 is connected to the second capacitor C2. Also, the cathode of the diode D3 is connected to the first capacitor C1, and the cathode of the diode D4 is connected to the second capacitor C2. The contact node of the diode D3 and the diode D4 has a reference potential Vgd (0 V). Also, the reference potential Vgd may be a ground level. That is, the contact node may be connected to a frame ground.

The smoothing circuit 32 is electrically connected to the rectifier circuit 31, and smoothes the rectified AC voltage, thereby generating a smooth voltage VDD as an output voltage. The smoothing circuit 32 includes a smoothing storage capacitor C3 and a Zener diode ZD1.

The smoothing storage capacitor C3 is electrically connected to the 5-volt output terminal OUT2 of the switching power supply 20 through a diode D5. Therefore, when electric power is supplied to the printer 1, it is possible to charge the smoothing storage capacitor C3 and the storage capacitor C4 in a short time by DC 5 V of the switching power supply 20.

Also, the Zener diode ZD1 is for suppressing a rise of the smooth voltage VDD in a case where the AC voltage Vac of the AC power supply AC rises. The Zener voltage of the Zener diode ZD1 is, for example, 6.2 V. The DC to DC converter 33 converts an input voltage into DC 3.3 V, and outputs DC 3.3 V.

2-2. Configuration of Control Unit

As shown in FIGS. 1 and 2, the control unit 50 includes an application specific integrated circuit (ASIC) 60, the power supply key control IC 70, a ROM 51, a RAM 52, and the mode signal transmitting unit 53.

The ASIC (an example of a system control unit) 60 controls the whole of the electric power system 100, and controls the printing unit 2 of the printer 1. The ASIC 60 receives DC 3.3 V from the DC to DC converter 28 when the switching power supply 20 is in the ON mode. Therefore, when the switching power supply 20 is in the OFF mode, since electric power is not supplied to the ASIC 60, the ASIC 60 stops operating. Also, the ASIC 60 outputs an ON mode setting signal SSon or an OFF mode setting signal SSoff (to be described below) to the power supply key control IC 70.

The power supply key control IC (an example of a mode control unit) 70 generates the ON mode signal Mon or the OFF mode signal Moff in response to the operation of the panel switch SW1 which is the power supply key, and outputs the generated signal to the power supply control IC 22 through the mode signal transmitting unit 53 (an example of an outputting process). That is, the power supply key control IC 70 has a function of outputting the ON mode signal Mon or the OFF mode signal Moff to the power supply control IC 22, thereby switching the operating mode of the switching power supply 20 between the ON mode and the OFF mode.

That is, the power supply key control IC 70 outputs the ON mode signal Mon to the power supply control IC 22, whereby the power supply control IC 22 oscillates the switching power supply 20 such that the switching power supply 20 is switched to the ON mode. Also, the power supply key control IC 70 outputs the OFF mode signal Moff to the power supply control IC 22, whereby the power supply control IC 22 stops oscillation of the switching power supply 20 such that the switching power supply 20 is switched to the OFF mode. Also, in the present embodiment, as described above, the ON mode signal Mon is a signal which is maintained at a low level for the ON mode signal confirmation period Kon or more, and the OFF mode signal Moff is a consecutive-pulse signal in which an OFF mode confirmation number Noff or more of pulses continue.

In order for the power supply key control IC 70 to perform the above described function, a port P1 of the power supply key control IC 70 is connected to the low-capacity power supply 30, such that electric power is supplied from the low-capacity power supply 30 to the power supply key control IC 70 regardless of the operating mode of the switching power supply 20.

The mode signal transmitting unit 53 includes a light emitting device LED2 of a photocoupler PC2 and a transistor Q2. The anode of the light emitting device LED2 is connected to a power supply line Ldc of the low-capacity power supply 30.

The light emitting device LED2 constitutes the photocoupler PC2, together with a phototransistor PT2 connected to an ON input terminal ON of the power supply control IC 22 of the switching power supply 20. Therefore, for example, if the ON mode signal Mon is output from a port P3 of the power supply key control IC 70 to the base of the transistor Q2, the ON mode signal Mon is optically transmitted through the photocoupler PC2, and is input to the ON input terminal ON of the power supply control IC 22.

Also, the user can use the power supply key SW1 included in the display unit 4 to instruct the power supply key control IC 70 to switch the mode of switching power supply 20 through a port P2. That is, if the power supply key SW1 is pressed, the power supply key SW1 generates a press signal Spr, and supplies the press signal Spr to the port P2.

Also, the power supply key control IC 70 includes an EEPROM (an example of a storage unit) 71 which stores mode information on whether the switching power supply 20 is in the ON mode or the OFF mode.

Also, the power supply key control IC 70 includes a voltage detecting circuit (an example of a power supply information generating circuit) 72. The voltage detecting circuit 72 detects the voltage value of DC 3.3 V (the output terminal OUT3) which is supplied from the DC to DC converter 28 to a port P4. Here, the voltage value of DC 3.3 V (the output terminal OUT3) is an example of power supply information representing whether the switching power supply 20 is oscillating or not. That is, the voltage detecting circuit 72 detects the output voltage (DC 3.3 V) of the switching power supply 20, thereby generating the power supply information. Also, the voltage detecting circuit 72 may not be provided inside the power supply key control IC 70, and may be provided outside the power supply key control IC 70. In this case, the voltage detecting circuit 72 outputs the voltage value of DC 3.3 V (the output terminal OUT3) to the power supply key control IC 70.

3. Operating Modes of Switching Power Supply and Control Operations

Subsequently, operations of the ASIC 60, the power supply key control IC 70, and the power supply control IC 22 relative to the mode setting of the switching power supply 20 will be described with reference to FIGS. 4 to 8. Also, step numbers S shown in FIG. 7 correspond to step numbers of FIGS. 4 to 6.

3-1. ASIC

Figure 4:
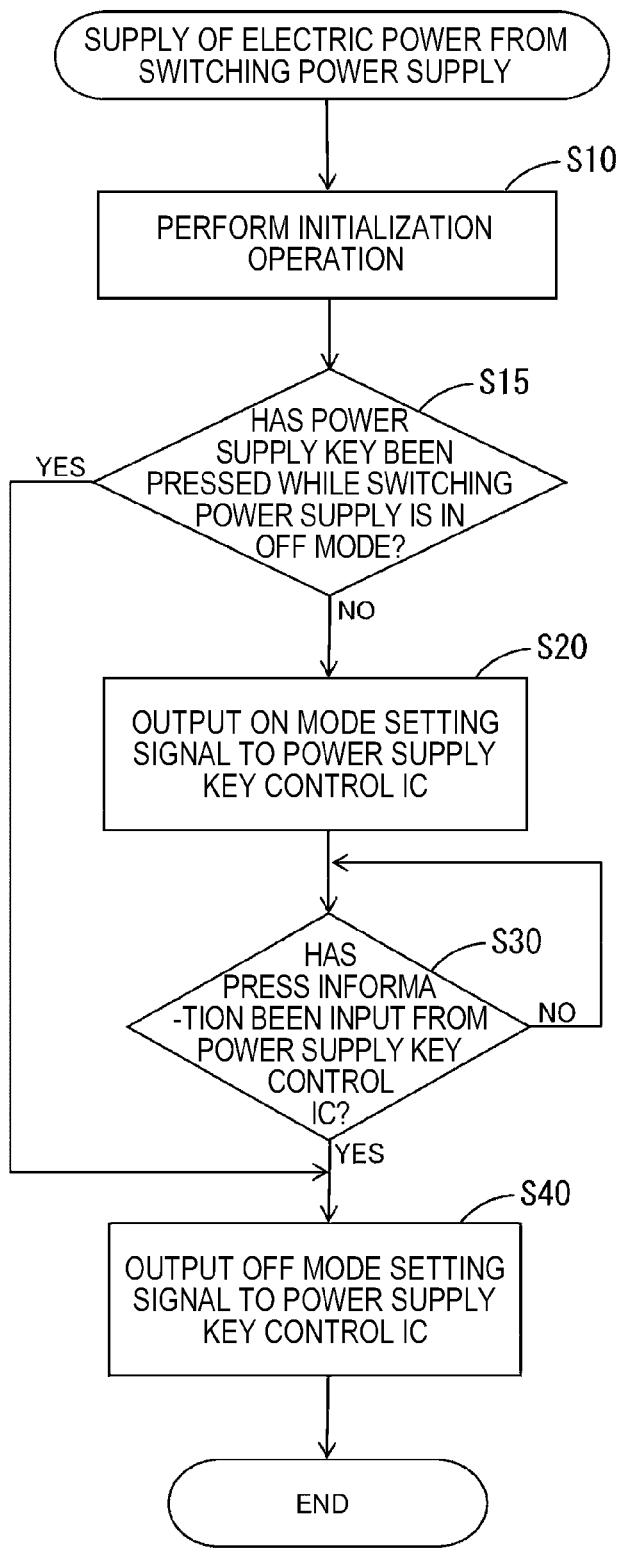
FIG. 4 is a flow chart illustrating a control process of an ASIC.
Figure 7:
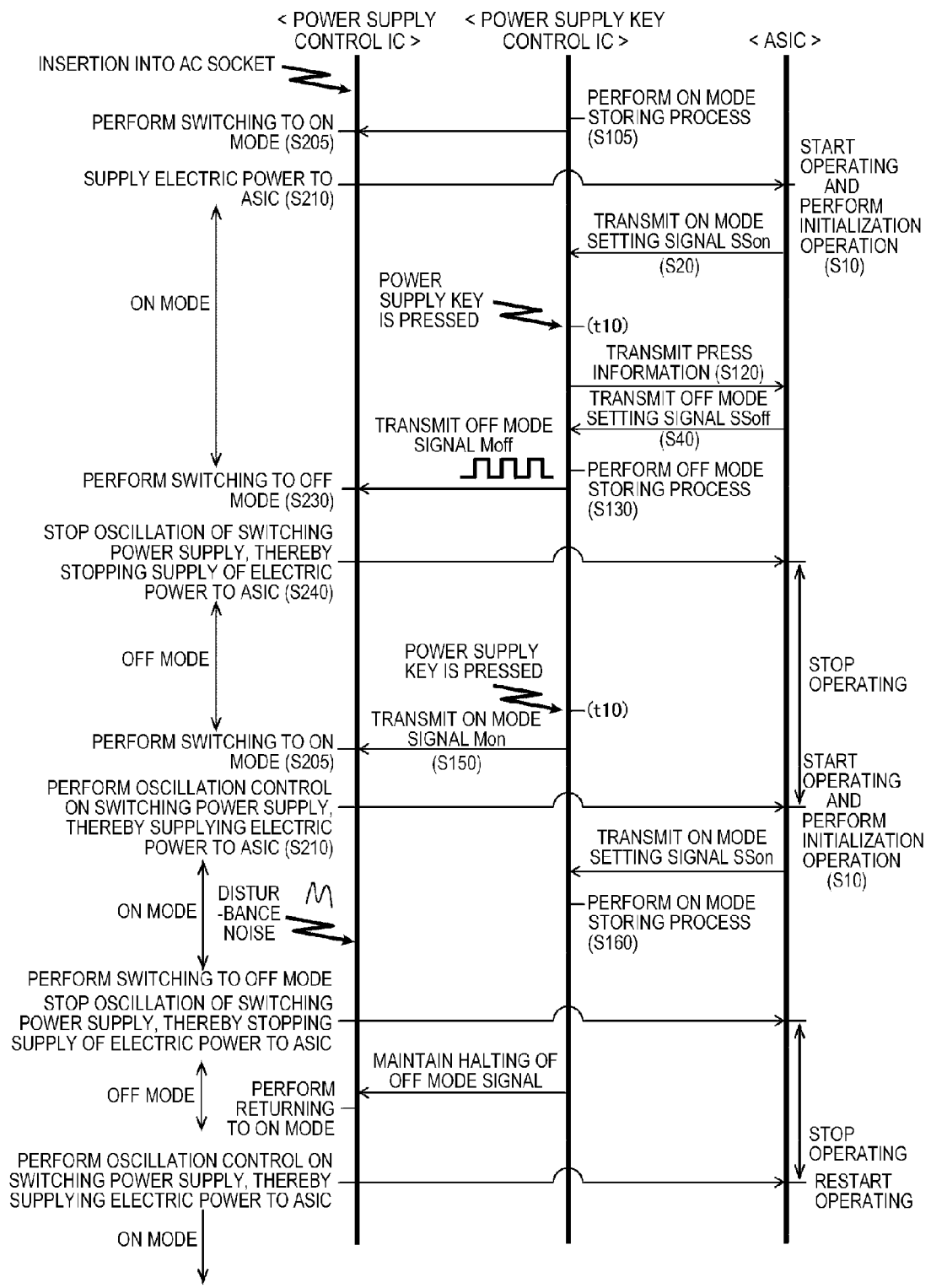
FIG. 7 is a sequence diagram illustrating operations of individual control units.

First, an operation of the ASIC 60 will be described with reference to FIGS. 4 and 7. As shown in FIGS. 4 and 7, for example, if an AC plug of the low-voltage power supply unit 10 is inserted into an AC socket, and the switching power supply 20 starts up, whereby DC 3.3 V is supplied from the switching power supply 20, the ASIC 60 starts up, and performs an initialization operation in STEP S10. In the initialization operation, for example, the ASIC 60 performs reset release of each block included in the ASIC 60, thereby operating a CPU included in the ASIC 60.

Next, in STEP S15, the ASIC 60 determines whether the switching power supply 20 is in the OFF mode and the power supply key SW1 has not been pressed. At this time, the ASIC 60 performs the determination with reference to the mode information stored in the EEPROM 71 and press information from the power supply key control IC 70 (see FIG. 5). In a case of determining that the switching power supply 20 is in the OFF mode and the power supply key SW1 has not been pressed ("YES" in STEP S15), in STEP S40, the ASIC 60 outputs the OFF mode setting signal SSoff to the power supply key control IC 70. That is, this case corresponds to a case where after the AC plug was removed from the socket in the OFF mode, the AC plug was inserted into the socket, and electric power has been supplied to the ASIC 60.

Meanwhile, in a case where the determination result of STEP S15 is negative, that is, in a case where the switching power supply 20 is in the ON mode and/or the power supply key SW1 has been pressed, in STEP S20, the ASIC 60 outputs the ON mode setting signal SSon to the power supply key control IC 70 (an example of an ON output process). Next, in STEP S30, the ASIC 60 determines whether any press information on press of the power supply key SW1 has been input from the power supply key control IC 70 during the ON mode of the switching power supply 20. In a case where any press information has not been input ("NO" in STEP S30), the ASIC 60 waits for press information to be input.

Meanwhile, in a case where press information has been input ("YES" in STEP S30), in STEP S40, the ASIC 60 outputs the OFF mode setting signal SSoff to the power supply key control IC 70 (an example of an OFF output process). As a result, the switching power supply 20 is switched to the OFF mode, whereby supply of electric power to the ASIC 60 stops and the ASIC 60 stops operating. Also, in a case where the power supply key SW1 is pressed for mode switching when the switching power supply 20 is in the OFF mode, the ASIC 60 repeats the operations of STEPS S10 to S40.

3-2. Power Supply Key Control IC

Figure 5:
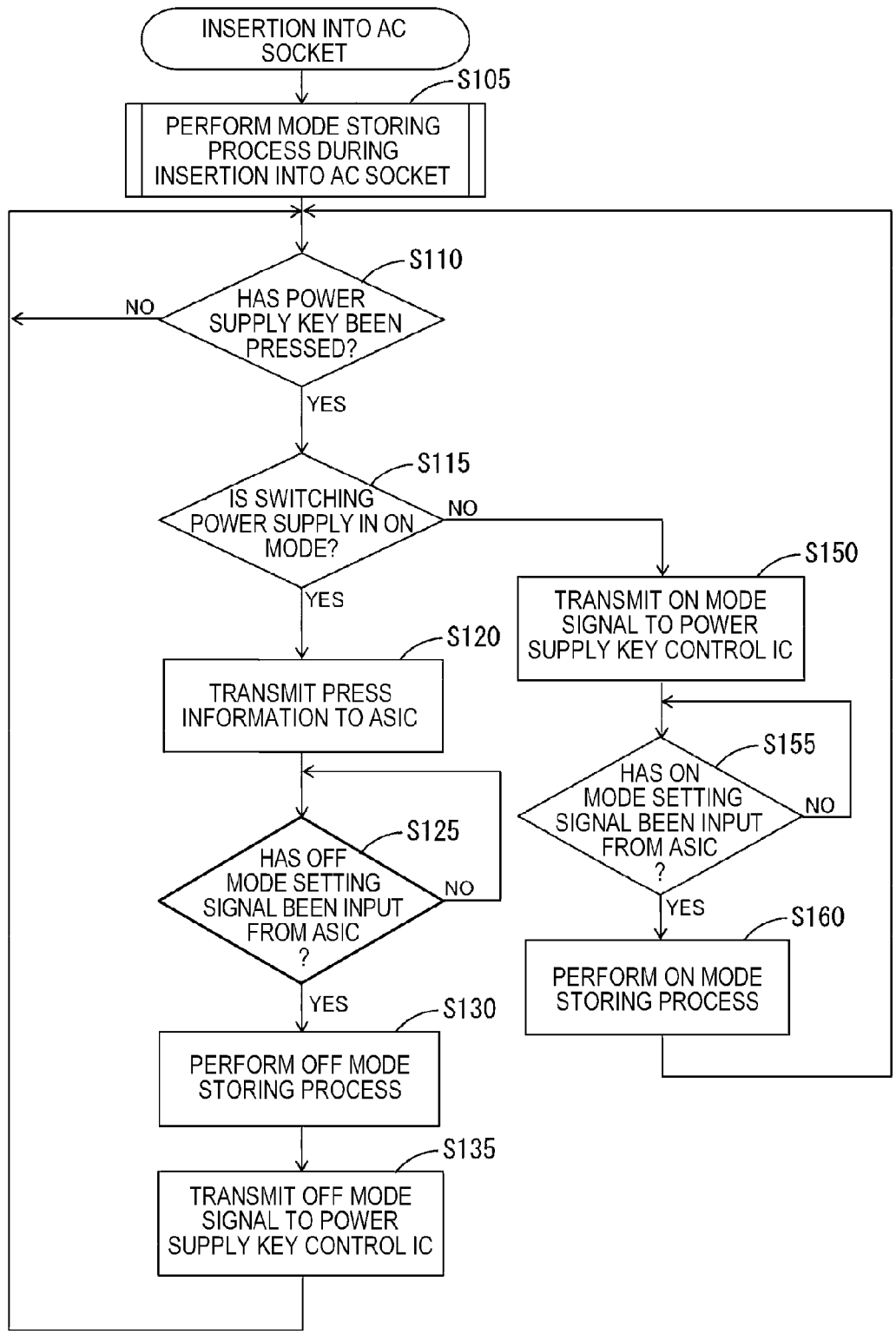
FIG. 5 is a flow chart illustrating a control process of a power supply key control circuit.

Subsequently, an operation of the power supply key control IC 70 will be described with reference to FIGS. 5 and 7. As shown in FIGS. 5 and 7, for example, if the AC plug of the low-voltage power supply unit 10 is inserted into the AC socket, and the low-capacity power supply 30 starts up, whereby electric power is supplied to the power supply key control IC 70, the power supply key control IC 70 performs a mode storing process during insertion of the AC plug in the AC socket (to be described below with reference to FIG. 9, FIG. 11, or the like) (STEP S105). Next, in STEP S110, the power supply key control IC 70 determines whether the power supply key SW1 has been pressed. The power supply key control IC 70 performs the determination by detecting the press signal Spr which is output from the power supply key if the power supply key SW1 is pressed (an example of a press detecting process).

Figure 8:
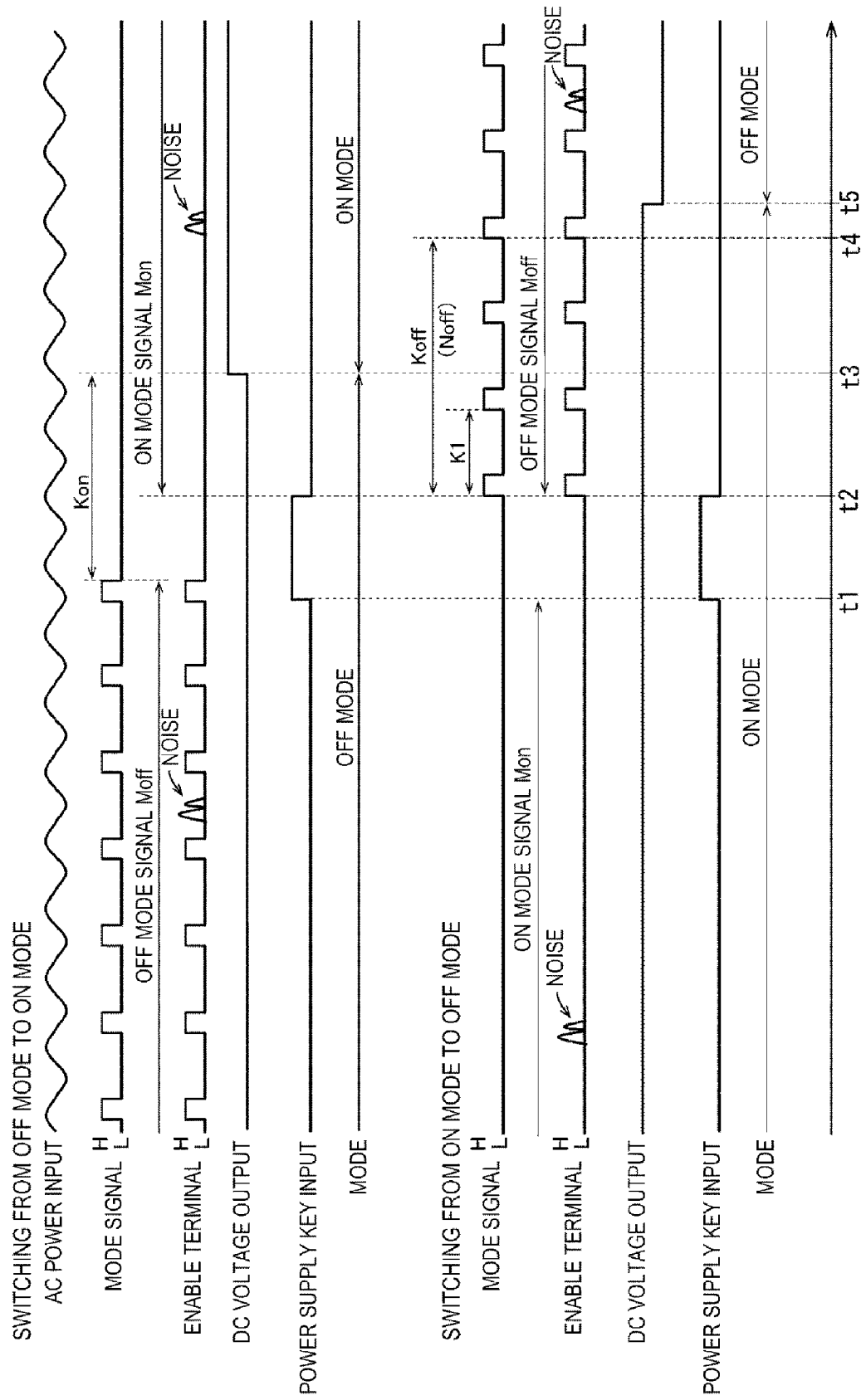
FIG. 8 is a time chart illustrating transitions of individual signals during mode switching.

In a case where the power supply key SW1 has not been pressed ("NO" in STEP S110), the power supply key control IC 70 waits for the power supply key SW1 to be pressed (see a period until a time t1 of FIG. 8). Meanwhile, in a case where the power supply key SW1 has been pressed ("YES" in STEP S110) (see the time t1 of FIG. 8), in STEP S115, the power supply key control IC 70 determines whether the mode information stored in the EEPROM 71 represents that the switching power supply 20 is in the ON mode. In a case of determining that the mode information stored in the EEPROM 71 represents that the switching power supply 20 is in the ON mode ("YES" in STEP S115), in STEP S120, the power supply key control IC 70 outputs the press information representing that the press signal Spr has been detected, to the ASIC 60 (an example of the press output process).

Next, in STEP S125, the power supply key control IC 70 determines whether the OFF mode setting signal SSoff has been input from the ASIC 60 according to the press signal Spr. In a case where the OFF mode setting signal SSoff has not been input ("NO" in STEP S125), the power supply key control IC 70 waits for the OFF mode setting signal SSoff to be input. Meanwhile, in a case where the OFF mode setting signal SSoff has been input ("YES" in STEP S125), in STEP S130, the power supply key control IC 70 stores mode information representing the OFF mode in the EEPROM 71 (an example of an OFF mode storing process). Thereafter, the power supply key control IC 70 transmits the OFF mode signal Moff to the power supply control IC 22 in order to set the switching power supply 20 to the OFF mode, in STEP S135 (an example of the outputting process), and returns to the process of STEP S110 (see a time t2).

Meanwhile, in a case where it is determined in STEP S115 that the mode information stored in the EEPROM 71 represents that the switching power supply is not in the ON mode, that is, the switching power supply is in the OFF mode ("NO" in STEP S115), in order to set the switching power supply 20 to the ON mode, in STEP S150, the power supply key control IC 70 transmits the ON mode signal Mon to the power supply control IC 22 (an example of the outputting process or a restriction process) (see the time t2). Next, in STEP S155, the power supply key control IC 70 determines whether the ON mode setting signal SSon has been input from the ASIC 60. In a case where the ON mode setting signal SSon has not been input ("NO" in STEP S155), the power supply key control IC 70 waits for the ON mode setting signal SSon to be input. Meanwhile, in a case where the ON mode setting signal SSon has been input ("YES" in STEP S115), the power supply key control IC 70 stores mode information representing the ON mode, in the EEPROM 71, in STEP S160 (an example of an ON mode storing process), and returns to the process of STEP S110.

3-3. Power Supply Control IC

Figure 6:
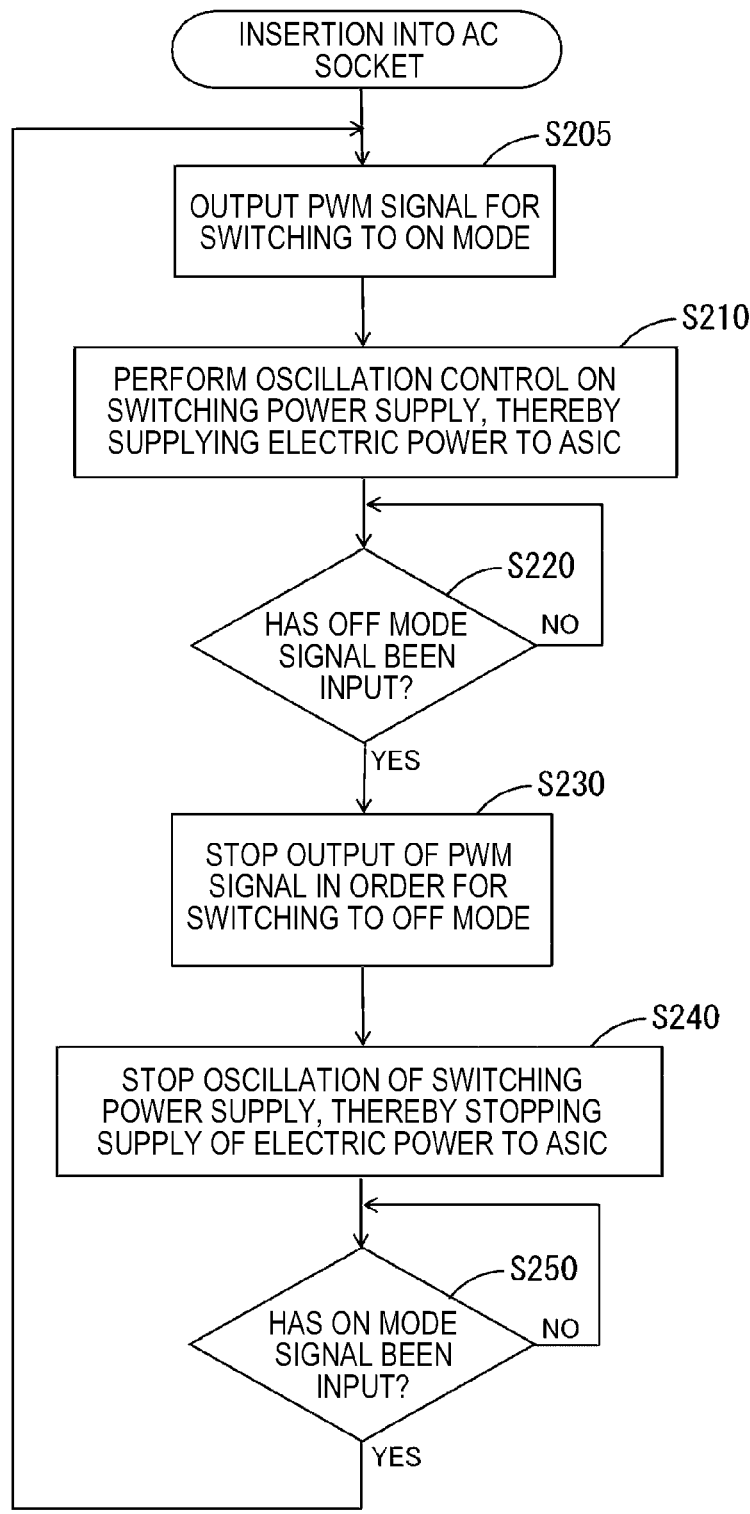
FIG. 6 is a flow chart a control process of the control IC.

Subsequently, an operation of the power supply control IC 22 will be described with reference to FIGS. 6 and 7. As shown in FIGS. 6 and 7, for example, if the AC plug of the low-voltage power supply unit 10 is inserted into the AC socket and electric power is supplied from the AC power supply AC to the power supply control IC 22, the power supply control IC 22 is activated, whereby the low-capacity power supply 30 starts up. As a result, the power supply key control IC starts operating. Then, if the ON mode signal Mon is input from the power supply key control IC, in order to set the switching power supply 20 to the ON mode, the power supply control IC 22 outputs the PWM signal from the output terminal OUT in STEP S205. Next, in STEP S210, the power supply control IC 22 starts oscillation control on the switching power supply 20, whereby electric power is supplied to the ASIC 60 (an example of an oscillation process). As a result, the ASIC 60 starts operating (see a time t3 of FIG. 8).

Next, in STEP S220, the power supply control IC 22 determines whether the power supply key SW1 has been pressed and the OFF mode signal Moff has been input from the power supply key control IC. In a case where the OFF mode signal Moff has not been input ("NO" in STEP S220), the power supply control IC 22 waits for the OFF mode signal Moff to be input. Meanwhile, in a case where the OFF mode signal Moff has been input ("YES" in STEP S220), if the OFF mode signal confirmation period Koff elapses (see a time t4 of FIG. 8), in order to set the switching power supply 20 to the OFF mode, in STEP S230, the power supply control IC 22 stops outputting the PWM signal from the output terminal OUT. Thereafter, the power supply control IC 22 stops oscillation control on the switching power supply 20. As a result, supply of electric power to the ASIC 60 stops (STEP S240) (an example of an oscillation stopping process) (see a time t5).

Next, in STEP S250, the power supply control IC 22 determines whether the power supply key SW1 has been pressed during the OFF mode and the ON mode signal Mon has been input from the power supply key control IC 70. In a case where the ON mode signal Mon has not been input ("NO" in STEP S250), the power supply control IC 22 waits for the ON mode signal Mon to be input. Meanwhile, in a case where the ON mode signal Mon has been input ("YES" in STEP S250), the power supply control IC 22 returns to the process of STEP S205.

As described above, in the present embodiment, as the OFF mode signal Moff designating the OFF mode of the switching power supply 20, a consecutive-pulse signal with a predetermined cycle K1 is used, and as the ON mode signal Mon designating the ON mode, a signal which is maintained at a low level (a signal which is obtained by restricting the OFF mode signal Moff) is used. Therefore, as shown in FIG. 8, even in a case where disturbance noise or the like is input to the enable terminal (mode designation terminal) EN in the ON mode, the disturbance noise is suppressed from causing the OFF mode to be designated. Also, as shown in FIG. 8, even in a case where disturbance noise or the like is input to the enable terminal EN in the OFF mode, the disturbance noise is suppressed from influencing the OFF mode.

Also, even if disturbance noise or the like is input to the enable terminal EN in the ON mode, whereby the switching power supply 20 is switched to the OFF mode, as shown in FIG. 7, the power supply key control IC 70 maintains halting of the OFF mode signal Moff, that is, transmission of the ON mode signal Mon, whereby it is possible to return the switching power supply 20 to the ON mode, and restart the operation of the ASIC 60.

4. Operations of Individual Control Units During Power-on

Subsequently, operations of individual control units during power-on of the printer 1, that is, the mode storing process of STEP S105 which is shown in FIG. 5 and is performed if the AC plug is inserted into the AC socket will be described in detail with reference to FIGS. 9 to 13. Here, power-on means that the AC plug is inserted into the AC socket, that is, the AC power supply of the printer 1 is turned on.

4-1. Case Where Power-Off was Performed in Off Mode

Figure 9:
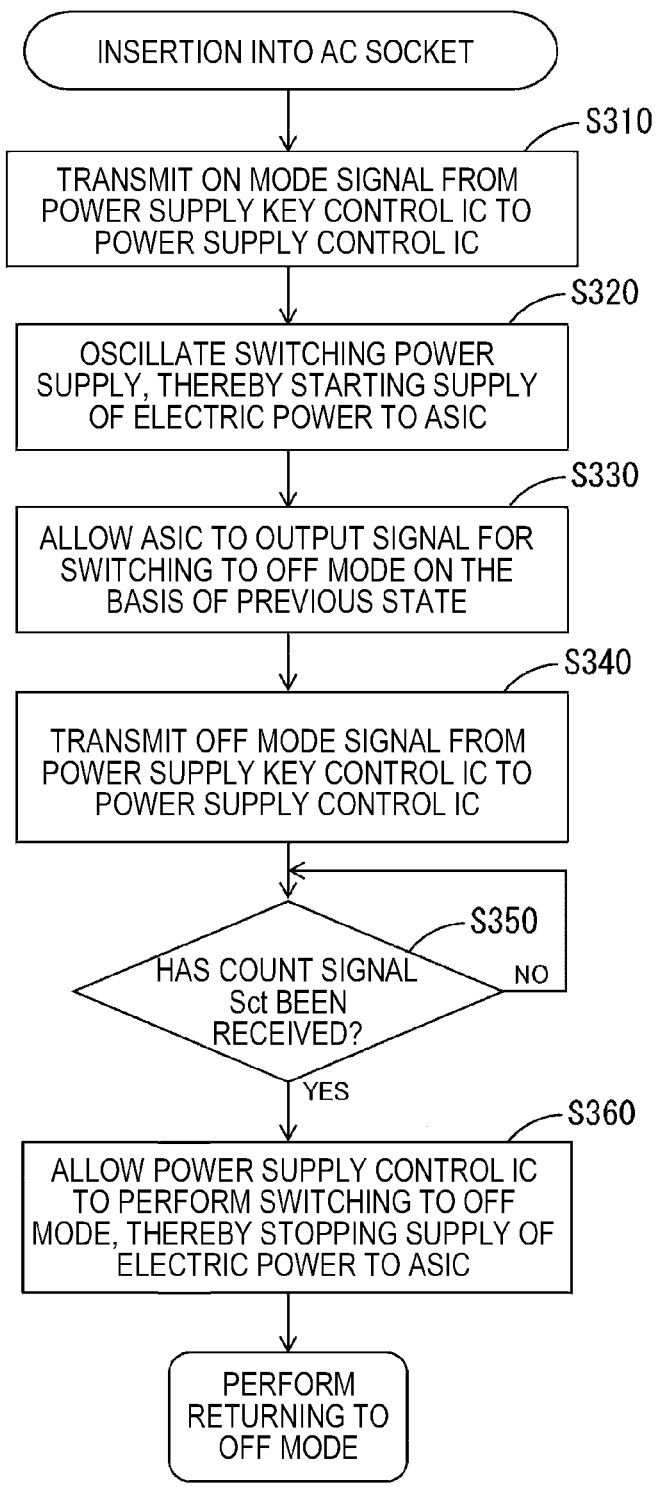
FIG. 9 is a flow chart relating to processes during power-on after a power supply is turned off in an OFF mode.
Figure 10:
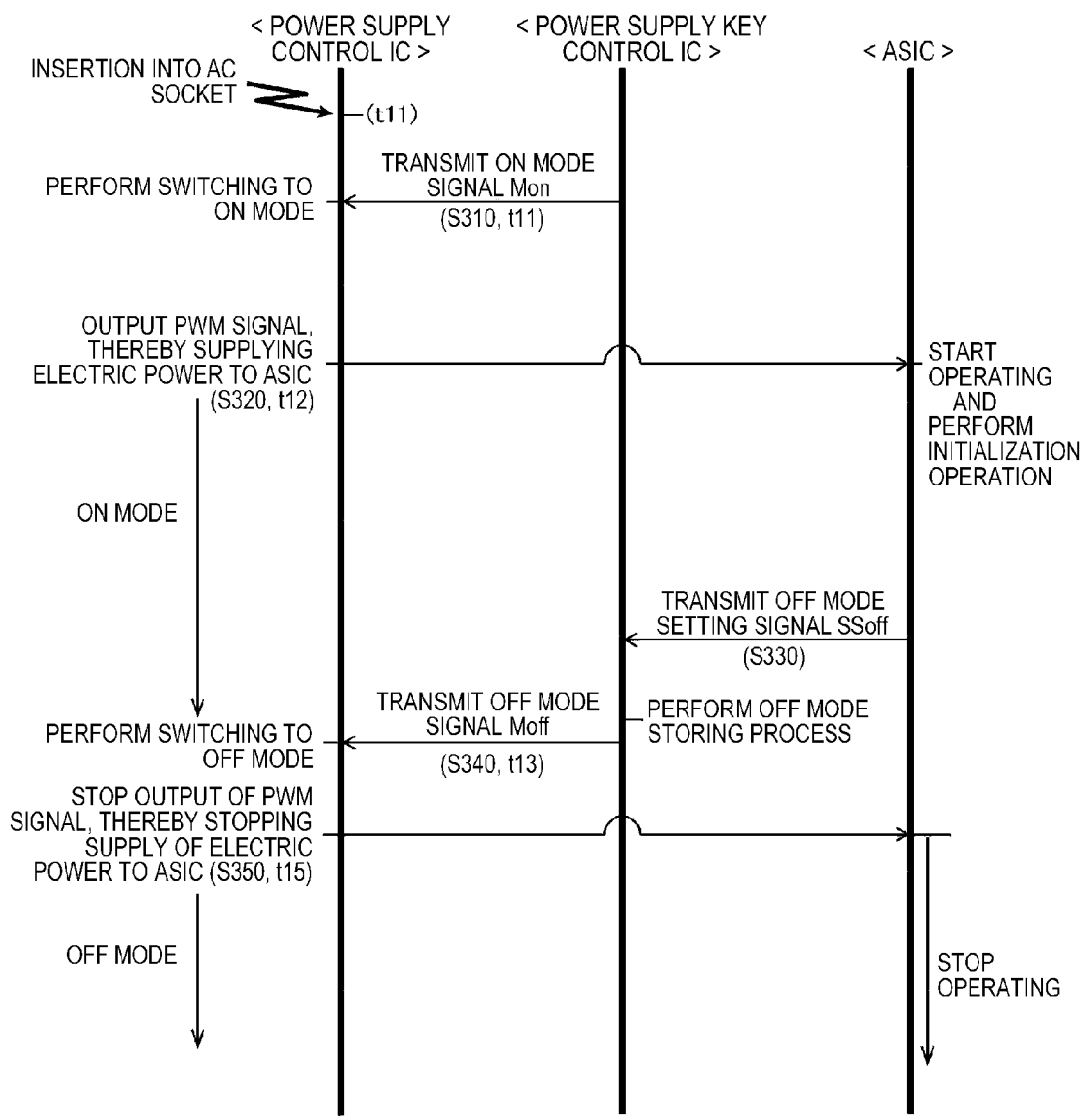
FIG. 10 is a sequence diagram illustrating operations of the individual control units during power-on after the power supply is turned off in the OFF mode.

First, operations of individual control units during power-on in a case where the previous power-off has been performed in the OFF mode, that is, in a case where the mode information stored in the EEPROM 71 represents the switching power supply is in the OFF mode will be described with reference to FIGS. 9, 10, and 13. Here, power-off means that the AC plug is removed from the AC socket. Also, step numbers S shown in FIG. 10 correspond to step numbers of FIG. 9, and time reference symbols t correspond to time reference symbols of FIG. 13.

Figure 13:
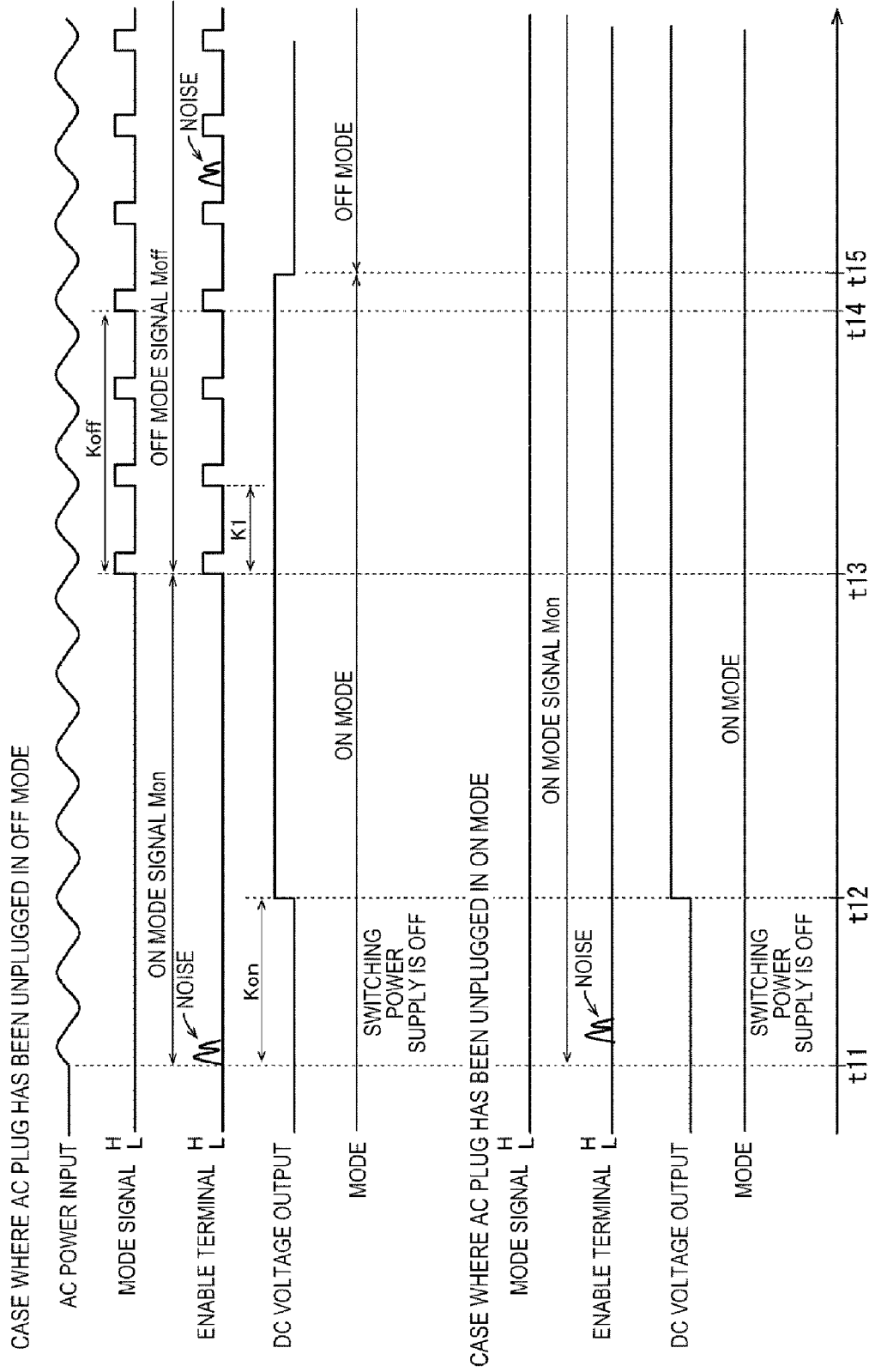
FIG. 13 is a time chart relating to processes during start of power supply.

Now, it is assumed that at a time t11 of FIG. 13, the AC plug is inserted into the AC socket, whereby the printer 1 is powered on. In this case, in STEP S310, the power supply key control IC 70 transmits the ON mode signal Mon, that is, the signal which is obtained by halting the OFF mode signal Moff which is a consecutive-pulse signal and is maintained at the low level, to the power supply control IC 22.

Also, switching of the switching power supply 20 to the ON mode during power-on, that is, when the AC plug is inserted into the AC socket is not performed only by the ON mode signal Mon. For example, a power detecting unit may be provided in the power supply control IC 22 such that the power detecting unit is connected to the high-voltage input terminal VH and detects start of supply of electric power from the AC power supply AC to the electric power system 100, and switching of the switching power supply 20 to the ON mode may be performed on the basis of the power detection of the power detecting unit.

If the predetermined ON mode signal confirmation period Kon elapses after the ON mode signal Mon is received, the power supply control IC 22 starts oscillation of the switching power supply 20, thereby starting supply of electric power to the ASIC 60 in STEP S320 (see a time t12). At this time, in order to switch the switching power supply 20 to the ON mode, the power supply control IC 22 outputs the PWM signal from the output terminal OUT. The power supply control IC 22 thereby starts oscillation control on the switching power supply 20, whereby electric power is supplied to the ASIC 60. As a result, the ASIC 60 starts operating, and performs the initialization operation.

Then, the ASIC 60 determines that power-off was performed in the previous OFF mode, on the basis of the mode information stored in the EEPROM 71 and representing that the switching power supply 20 is in the OFF mode, and in order to perform switching to the OFF mode in which power-off was performed, the ASIC 60 outputs the OFF mode setting signal SSoff to the power supply key control IC 70 in STEP S330. Thereafter, in STEP S340, the power supply key control IC 70 transmits the OFF mode signal Moff which is a consecutive-pulse signal, to the mode designation terminal NE (see a time t13).

Next, in STEP S350, the power supply control IC 22, particularly, the drive control unit 22C determines whether the count signal Sct representing that counting of the predetermined number of (here, four) pluses with the predetermined cycle K1 has been received (an example of an example of a validity determining process). In a case of determining that the count signal Sct has not been received ("NO" in STEP S350), the power supply control IC 22 waits for the count signal Sct to be received. Meanwhile, in a case of determining that the count signal Sct has been received ("YES" in STEP S350), in STEP S360, the power supply control IC 22 determines that the OFF mode signal Moff is valid, and performs mode switching from the ON mode to the OFF mode (see a time t14), thereby stopping oscillation of the switching power supply 20, and stopping supply of electric power to the ASIC 60 (an example of the oscillation stopping process). As a result, in STEP S370, the mode of the switching power supply 20 during the current power-on is returned to the OFF mode in which the previous power-off was performed (see a time t15).

As described above, during power-on, the ON mode signal Mon which is maintained at the low level is supplied to the mode designation terminal NE, and switching to the OFF mode is performed on the basis of the count signal Sct relative to the OFF mode signal Moff which is a consecutive-pulse signal. Therefore, even if noise is input to the mode designation terminal NE during power-on, the noise is suppressed from being mistakenly recognized as the OFF mode signal Moff, and the reliability of returning to a mode in which the previous power-off was performed is improved.

4-2. Case Where Power-Off was Performed in On Mode

Figure 11:
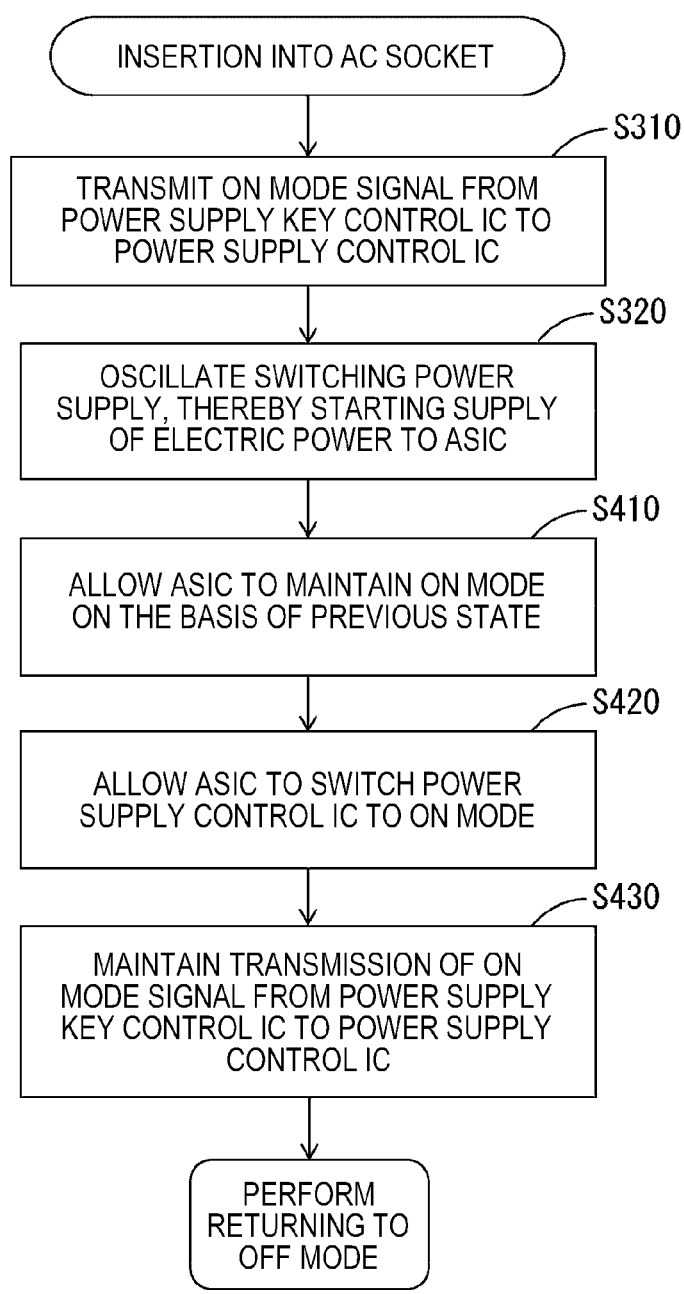
FIG. 11 is a flow chart relating to processes during power-on after the power supply is turned off in an ON mode.
Figure 12:
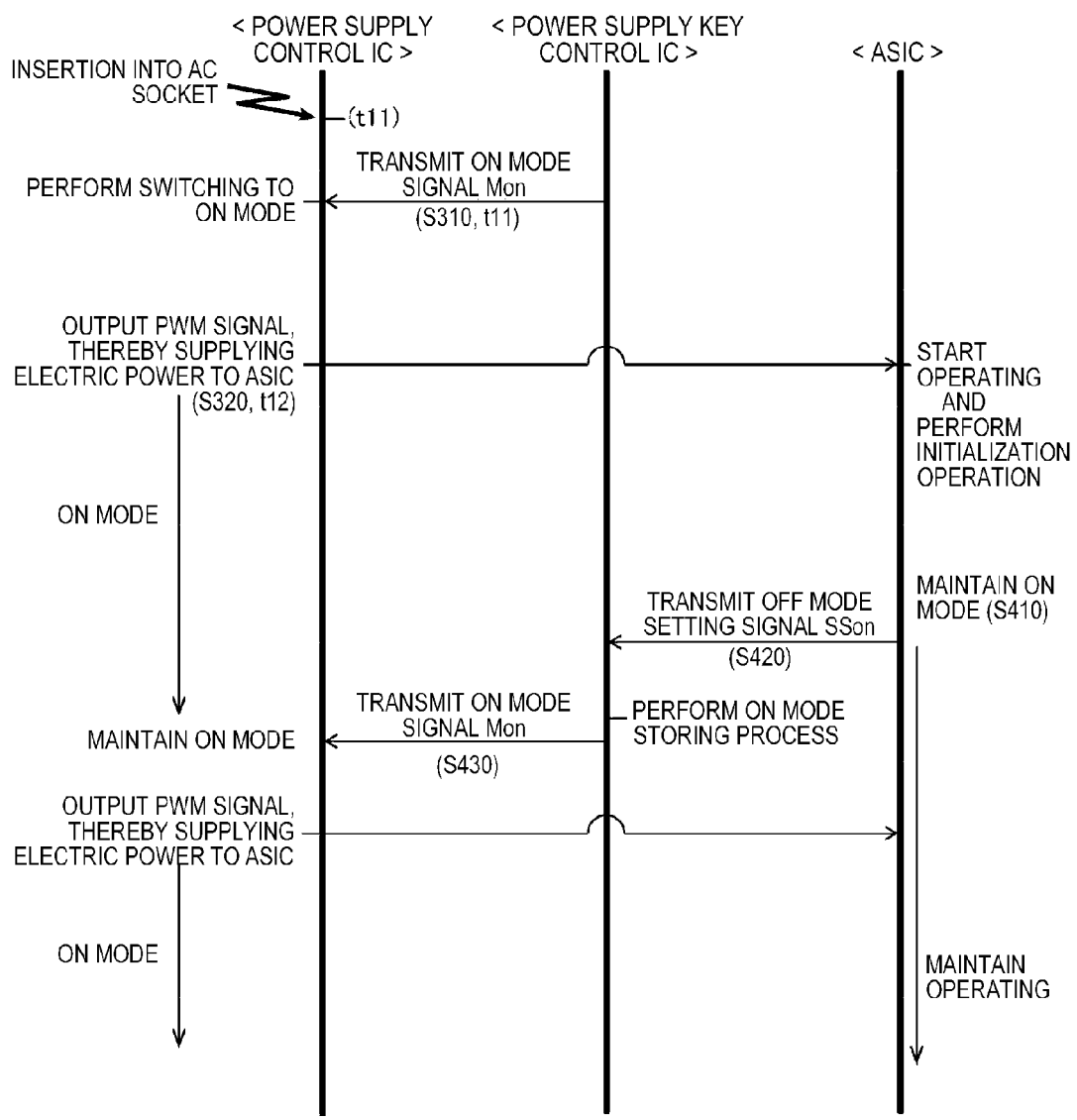
FIG. 12 is a sequence diagram illustrating operations of the individual control units during power-on after the power supply is turned off in the ON mode.

Subsequently, a mode storing process during power-on in a case where the previous power-off is performed in the ON mode, that is, in a case where the mode information set in the EEPROM 71 represents the switching power supply is in the ON mode will be described with reference to FIGS. 11 to 13. Also, processes identical to those of FIG. 9 are denoted by the same step numbers and will not be described. Further, step numbers S shown in FIG. 12 correspond to step numbers of FIG. 11, and time reference symbols t correspond to time reference symbols of FIG. 13. Furthermore, actual times are different from those in the case where power-off was performed in the OFF mode, but are shown as the same times as those in the case where power-off was performed in the OFF mode, in FIG. 13, for convenience of explanation.

If the power supply control IC 22 starts oscillation of the switching power supply 20 according to the ON mode signal Mon, thereby starting supply of electric power to the ASIC 60 in STEP S320 (see the time t12), the ASIC 60 determines that power-off was performed in the previous ON mode, on the basis of the mode information stored in the EEPROM 71 and representing that the switching power supply 20 is in the ON mode, and maintains the ON mode in which power-off was performed, in STEP S410.

In order to maintain the ON mode, in STEP S420, the ASIC 60 outputs the ON mode setting signal SSon to the power supply key control IC 70. Then, the power supply key control IC 70 maintains transmission of the ON mode signal Mon of the low level to the power supply control IC 22 in STEP S430.

As a result, in STEP S440, the mode of the switching power supply 20 during the current power-on is returned to the ON mode in which the previous power-off was performed (see a time t12).

Even in this case, since the ON mode signal Mon which is maintained at the low level is supplied to the mode designation terminal NE, even if noise is input to the mode designation terminal NE during power-on, the noise is suppressed from being mistakenly recognized as the OFF mode signal Moff, and the reliability of returning to a mode in which the previous power-off was performed is improved.

5. Effects of First Embodiment

In a case of designating the OFF mode as the operating mode of the switching power supply 20 by the OFF mode signal Moff designating the OFF mode, a consecutive-pulse signal in which pulses continue in an OFF mode designation period is used. Therefore, after the power cord of the electric power system 100 is inserted into a socket, even if disturbance noise or the like is input to the enable terminal (mode designation terminal) EN, the disturbance noise is suppressed from causing the OFF mode to be designated. Therefore, when the electric power system starts up, the switching power supply is suppressed from becoming the OFF mode.

That is, since a consecutive-pulse signal is used as the OFF mode signal Moff (mode designation signal), resistance to disturbance noise or the like which is input to the enable terminal EN is improved. Therefore, in the electric power system 100 in which the oscillation operation of the switching power supply 20 is switched by pluses, it is possible to suppress failures from being caused by disturbance noise.

Second Embodiment

Figure 14:
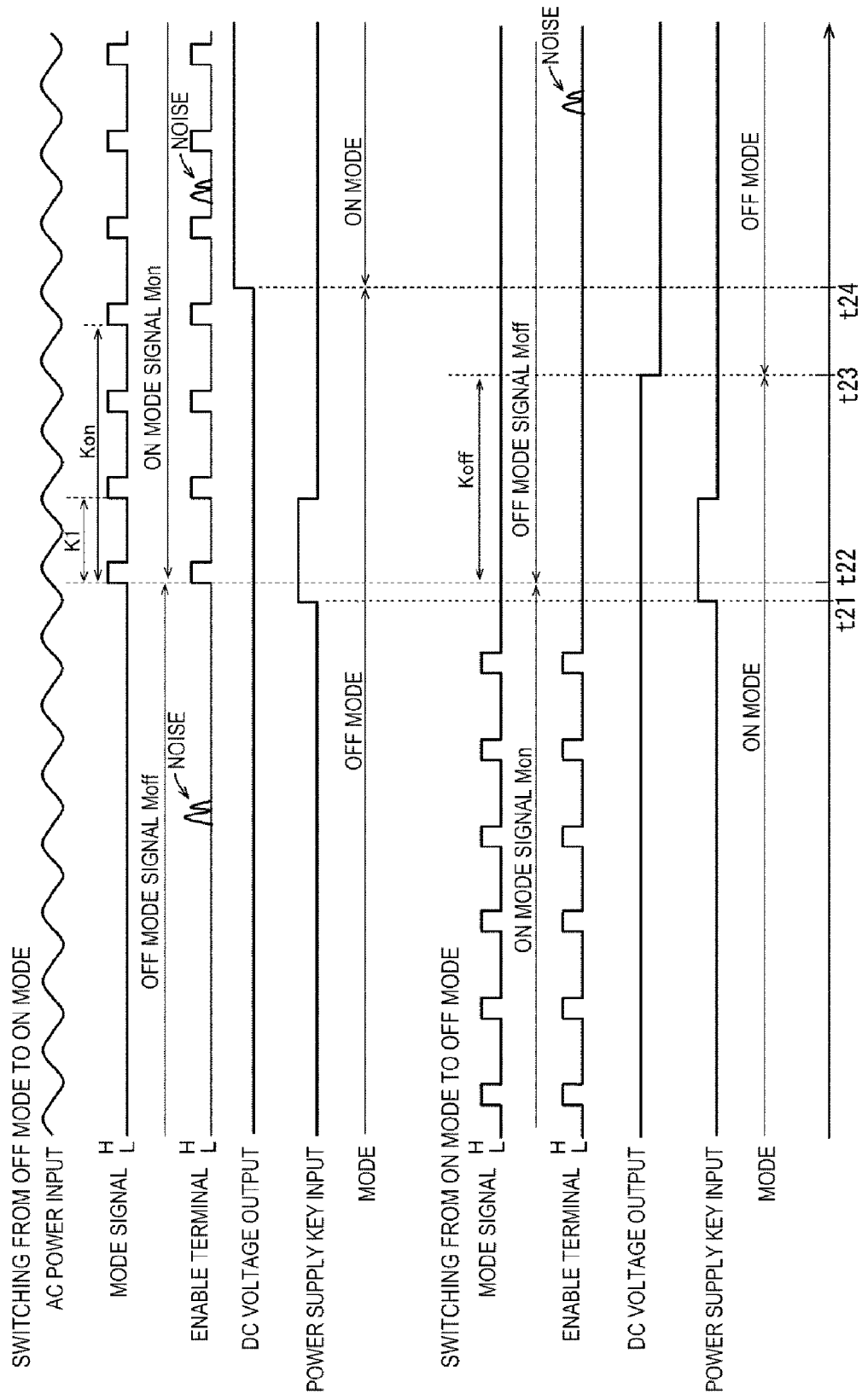
FIG. 14 is a time chart illustrating transitions of individual signals during mode switching according to a second embodiment.
Figure 15:
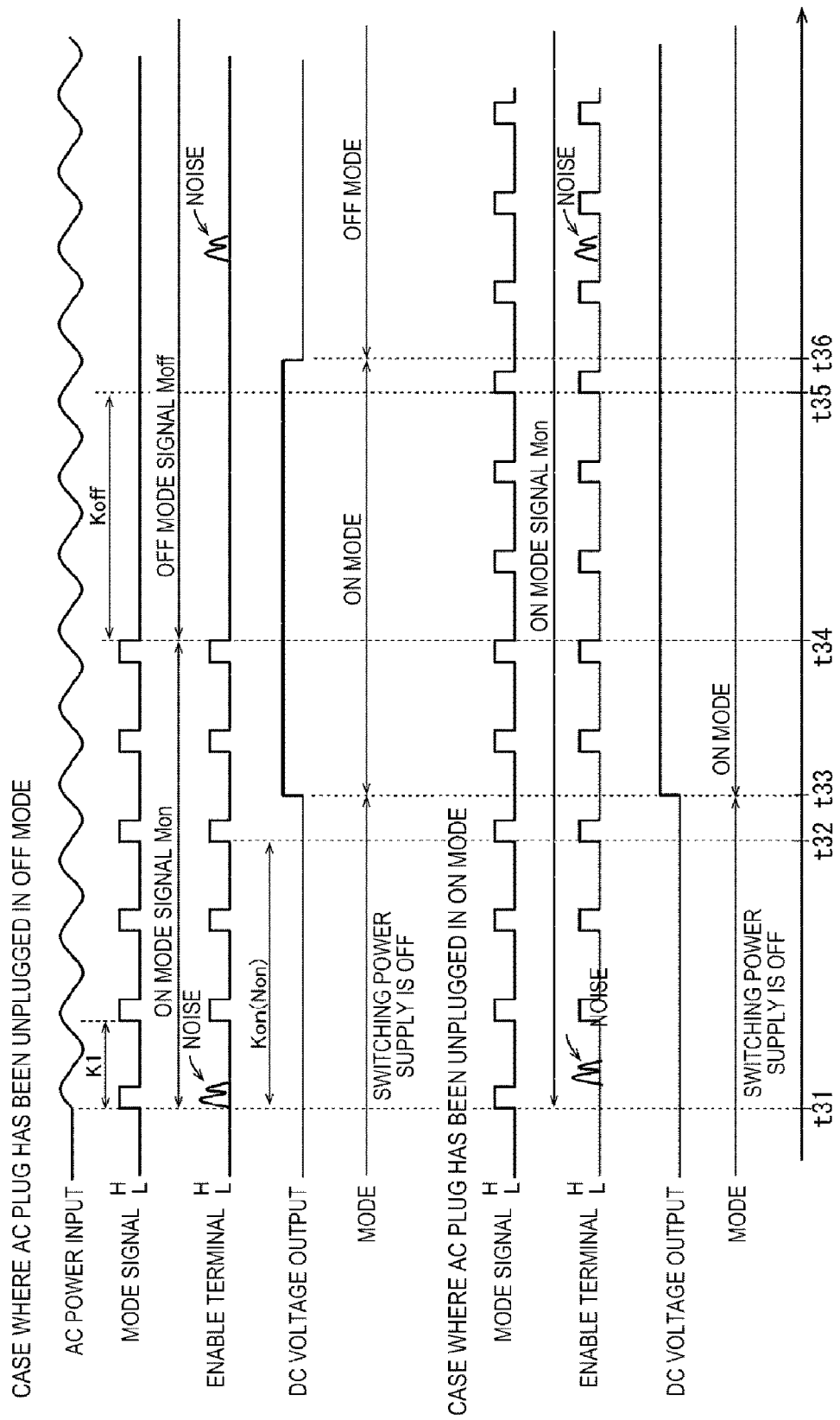
FIG. 15 is a time chart relating to processes during start of power supply according to the second embodiment.

Subsequently, a secondary embodiment will be described with reference to FIGS. 14 and 15. The second embodiment is different from the first embodiment in that the waveforms of the ON mode signal Mon and the OFF mode signal Moff are reversed. That is, in the second embodiment, as shown in FIGS. 14 and 15, the power supply key control IC 70 generates a consecutive-pulse signal with the predetermined cycle K1 as the ON mode signal Mon, and restricts output of the consecutive-pulse signal on the occasion of designating the OFF mode (an example of the restriction process). In the second embodiment, similarly in the first embodiment, the power supply key control IC 70 halts generation of the consecutive-pulse signal. Therefore, as the OFF mode signal Moff, a low-level signal which is maintained at a low level is generated. Also, in the second embodiment, the ON time measurement signal Skon of the first embodiment becomes an OFF time measurement signal Skoff, and the count signal Sct becomes a signal corresponding to the ON mode signal confirmation period Kon.

That is, in the second embodiment, the OFF mode signal Moff is a signal which is maintained at a low level for the OFF mode signal confirmation period Kon or more, and the OFF mode signal Moff is a consecutive-pulse signal in which an ON mode confirmation number Non or more of pulses continue in the predetermined cycle.

In this case, if the power supply key SW1 is pressed at a time t21 of FIG. 14 in order to perform switching from the OFF mode to the ON mode, at a time t22, the power supply key control IC 70 starts transmission of the ON mode signal Mon which is a consecutive-pulse signal, to the power supply control IC 22. Then, if the ON mode signal confirmation period Kon elapses from the time t22, the power supply control IC 22 oscillates the switching power supply 20 such that the mode is switched from the OFF mode to the ON mode (see a time t24).

Meanwhile, if the power supply key SW1 is pressed at the time t21 of FIG. 14 in order to perform switching from the ON mode to the OFF mode, at the time t22, the power supply key control IC 70 starts transmission of the OFF mode signal Moff which is a low-level signal at the low level, to the power supply control IC 22. Then, if the OFF mode signal confirmation period Koff elapses from the time t22, the power supply control IC 22 stops oscillation of the switching power supply 20, whereby the mode is switched from the ON mode to the OFF mode (see a time t23).

Even in this case, similarly in the first embodiment, as shown in FIG. 14, even if disturbance noise or the like is input to the enable terminal (mode designation terminal) EN in the ON mode, the disturbance noise is suppressed from causing the OFF mode to be designated. Also, even in a case where disturbance noise or the like is input to the enable terminal EN in the OFF mode, the disturbance noise is suppressed from causing the ON mode to be designated.

Also, as shown in FIG. 15, in a case where power-off has been performed in the OFF mode, during power-on (a time t31), the ON mode signal Mon which is a consecutive-pulse signal with the predetermined cycle K1 is supplied to the mode designation terminal NE, and if the ON mode signal confirmation period Kon elapses (a time t32), switching to the ON mode is performed (a time t33). Also, if the OFF mode signal confirmation period Koff elapses from a rising time (a time t34) of the pulse signal (a time t35), switching to the OFF mode is performed (a time t36). Therefore, even if noise is input to the mode designation terminal NE during power-on, influence of the noise is suppressed, and the reliability of returning to the OFF mode in which the previous power-off was performed is improved.

Also, even in a case where power-off has been performed in the ON mode, during power-on, the ON mode signal Mon which is a consecutive-pulse signal is supplied to the mode designation terminal NE, and thereafter, the consecutive-pulse signal is continuously input to the mode designation terminal NE, whereby the ON mode is maintained. Therefore, even if noise is input to the mode designation terminal NE during power-on, influence of the noise is suppressed, and the reliability of returning to the ON mode in which the previous power-off was performed is improved.

Third Embodiment

Figure 16:
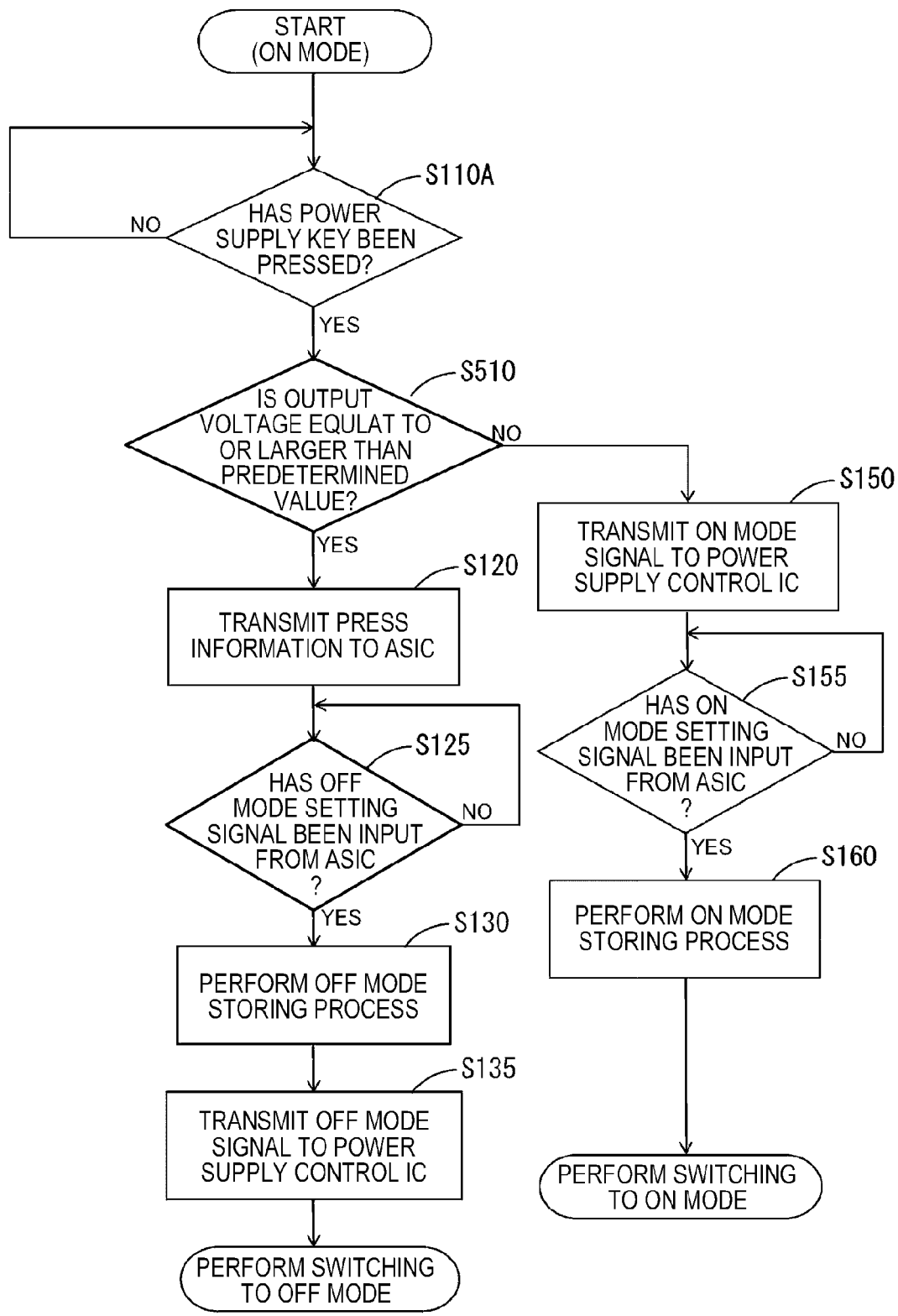
FIG. 16 is a flow chart relating to processes of a power supply key control IC according to a third embodiment.

Subsequently, an example in which if the power supply key SW1 is pressed, the power supply key control IC 70 determines the state of the power supply control IC 22 and mode setting is performed will be described with reference to FIGS. 16 and 17. Also, processes identical to those of FIG. 5 of the first embodiment are denoted by the same step numbers, and will be described in brief. Further, the circuit configuration of the electric power system 100 is the same as that of the first embodiment, and will not be described. The third embodiment is different from the first embodiment in a part of control of the power supply key control IC 70 and processes relating thereto.

In a case where the switching power supply 20 is in the ON mode, in STEP S110A, the power supply key control IC 70 determines whether the power supply key SW1 has been pressed. In a case where the power supply key SW1 has been pressed ("YES" in STEP S110A), in STEP S510, the power supply key control IC 70 determines whether the detection voltage of the voltage detecting circuit 72 is equal to or larger than a predetermined value, or not (an example of a determining process) (see FIG. 17).

Here, the detection voltage is an example of the power supply information representing whether the switching power supply 20 is oscillating or not. Also, the voltage detecting circuit 72 is an example of the power supply information generating circuit. However, the power supply information generating circuit is not limited to the voltage detecting circuit 72. The power supply control IC 22 may be configured so as to include a power supply information generating circuit such that the power supply information is supplied from the power supply control IC 22 to the power supply key control IC 70. In this case, for example, the power switching unit 22D of the power supply control IC 22 may generate the power supply information representing whether the switching power supply 20 is oscillating or not, on the basis of a voltage from the VCC terminal.

This process is an example of a determining process of determining that the switching power supply 20 is in a normal state if power supply information representing that the switching power supply 20 is oscillating is generated and determining that the switching power supply 20 is in an abnormal state if power supply information representing that the switching power supply 20 is not oscillating, in a case where the mode information stored in the EEPROM 71 (the storage unit) represents that the switching power supply 20 is in the ON mode. In the case where the switching power supply 20 is in the ON mode, if the output voltage is equal to or larger than the predetermined voltage, the power supply key control IC 70 determines that the switching power supply 20 is in the normal state, and if the output voltage is less than the predetermined value, the power supply key control IC 70 determines that the switching power supply 20 is in the abnormal state.

In a case of determining that the detection voltage is equal to or larger than the predetermined value ("YES" in STEP S510), the power supply key control IC 70 determines that the switching power supply 20 is normally operating, and press of the power supply key SW1 is press for switching from the ON mode to the OFF mode, and performs the processes of STEPS S120 to S135. As a result, switching to the ON mode is performed.

Meanwhile, in a case of determining that the detection voltage is less than the predetermined value ("NO" in STEP S510), the power supply key control IC 70 determines that the switching power supply 20 is not normally operating for some reasons, and is in the OFF mode, and press of the power supply key SW1 is press for returning from the OFF mode to the ON mode, and performs the processes of STEPS S150 to S160. As a result, returning to the ON mode is performed. In this case, the process of STEP S150 is an example of an abnormal outputting process which is performed in a case of determining that the switching power supply 20 is in the abnormal state and is performed such that the ON mode signal (mode designation signal) Mon designating the ON mode is output to the power supply control IC 22.

As described above, according to the third embodiment, when the EEPROM 71 contains the mode information representing the switching power supply 20 is in the ON mode, even if oscillation of the switching power supply 20 is stopped due to noise or the like, it is possible to return the switching power supply 20 to the oscillation state by the abnormal outputting process (STEP S150).

Figure 17:
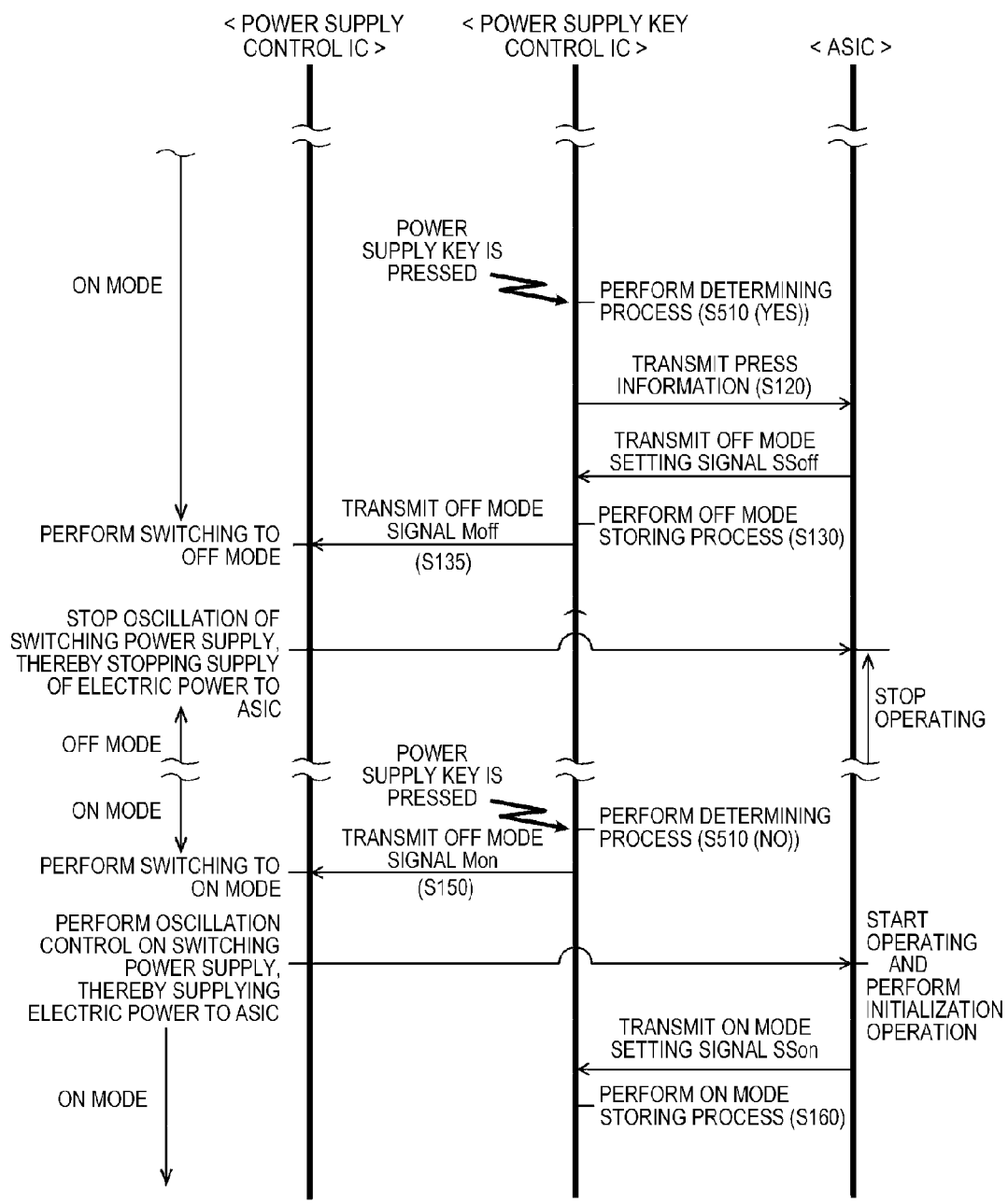
FIG. 17 is a sequence diagram illustrating operations of individual control units according to a third embodiment.

Also, the third embodiment can be applied even in a case where the switching power supply 20 is in the OFF mode (see FIG. 17). In this case, a case where the switching power supply 20 is oscillating is an abnormal state, and a case where the switching power supply 20 is not oscillating is a normal state. Therefore, in the determining process of STEP S510, if it is determined that the detection voltage is equal to or larger than the predetermined value ("YES" in STEP S510), the power supply key control IC 70 determines that the switching power supply 20 is in the abnormal state, and performs the processes of STEPS S120 to S135, thereby returning the switching power supply 20 to the ON mode. Meanwhile, in a case of determining in the determining process of STEP S510 that the detection voltage is less than the predetermined value ("NO" in STEP S510), the power supply key control IC 70 determines that the switching power supply 20 is in the normal state, and performs the processes of STEPS S150 to S160, thereby switching the switching power supply 20 to the ON mode.

Fourth Embodiment

Figure 18:
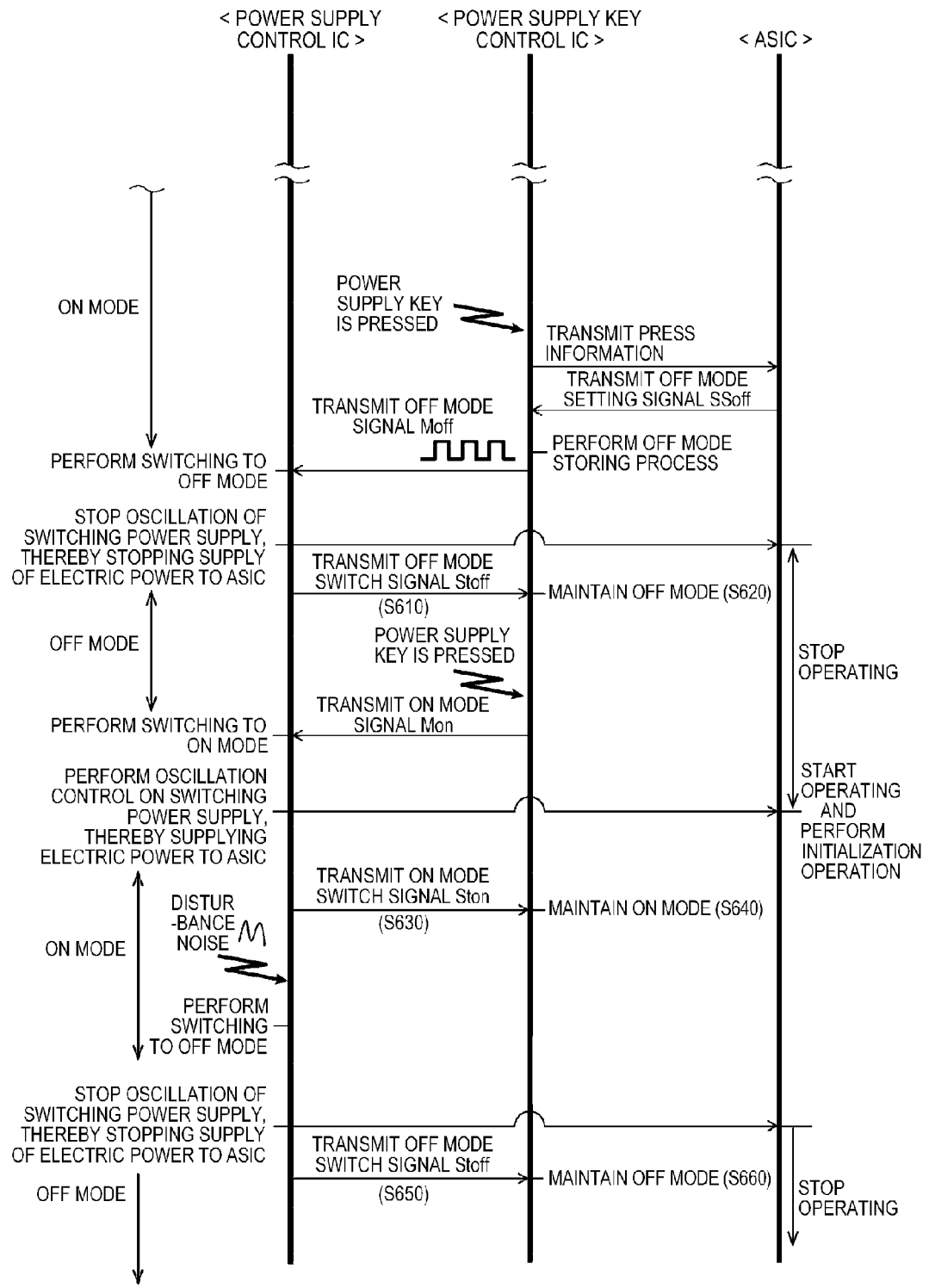
FIG. 18 is a sequence diagram illustrating operations of individual control units according to a fourth embodiment.

Subsequently, an example in which the power supply control IC 22 performs a process of transmitting a mode switch signal which is a signal representing that a mode designation signal has been input to the enable terminal EN, to the power supply key control IC 70 (an example of a change notifying process) will be described with reference to FIG. 18. For example, the drive control unit 22C of the power supply control IC 22 generates a mode switch signal Ston or Stoff on the basis of a signal which is input from the counter 22B or the timer 22A. Also, the circuit configuration of the electric power system 100 is the same as that of the first embodiment, and thus will not be described. The fourth embodiment is different from the first embodiment in a part of control of the power supply control IC 22 and processes relating thereto.

That is, in a case where the switching power supply 20 has been set to in the ON mode, if the power supply key SW1 is pressed, and the power supply control IC 22 receives the OFF mode signal Moff from the power supply key control IC 70 and switches the switching power supply 20 to the OFF mode, in STEP S610, the power supply control IC 22 transmits an OFF mode switch signal Stoff to the power supply key control IC 70. According to the OFF mode switch signal Stoff, the power supply key control IC 70 stores mode information representing which the switching power supply 20 is in the OFF mode, in the EEPROM 71, and maintains the OFF mode (STEP S620).

Meanwhile, in a case where the switching power supply 20 has been set to the OFF mode, if the power supply key SW1 is pressed, and the power supply control IC 22 receives the ON mode signal Mon from the power supply key control IC 70 and switches the switching power supply 20 to the ON mode, in STEP S630, the power supply control IC 22 transmits an ON mode switch signal Ston to the power supply key control IC 70. According to the ON mode switch signal Ston, the power supply key control IC 70 stores mode information representing which the switching power supply 20 is in the ON mode, in the EEPROM 71, and maintains the ON mode (STEP S640).

Also, in the case where the switching power supply 20 has been set to the ON mode, if the switching power supply 20 is switched to the OFF mode for some reasons such as disturbance noise, in STEP S650, the power supply control IC 22 transmits the OFF mode switch signal Stoff to the power supply key control IC 70. Also, the power supply control IC 22 stops oscillation of the switching power supply 20, thereby stopping supply of electric power to the ASIC 60. According to the OFF mode switch signal Stoff, the power supply key control IC 70 stores mode information representing which the switching power supply 20 is in the OFF mode, in the EEPROM 71, and maintains the OFF mode (STEP S660). Also, the ASIC 60 stops operating.

As described above, according to the fourth embodiment, in the case where the EEPROM 71 contains mode information representing that the switching power supply 20 is in the ON mode, even if disturbance noise or the like is input to the power supply control IC 22 and thus mode switching is performed such that oscillation of the switching power supply 20 stops, the power supply control IC 22 determines that the switching power supply 20 is in the abnormal state, and notifies determination result information to the power supply key control IC 70. As a result, the power supply key control IC 70 stores mode information representing that the switching power supply 20 is in the OFF mode, in the EEPROM 71. Therefore, even in a case where disturbance noise or the like is input, whereby mode switching is performed, it is possible to match the current operating mode with the mode information stored in the EEPROM 71.

Other Embodiments

The present invention is not limited to the embodiments described with reference to the drawings, but, for example, the following embodiments are included in the technical scope of the present invention.

(1) In the embodiments, an example of halting output of the consecutive-pulse signal in the restriction process of restricting outputting of the consecutive-pulse signal (an example of acquiring a signal which is maintained at a low level) has been described. However, the present invention is not limited thereto. For example, the pulse cycle of the consecutive-pulse signal may be lengthened.

(2) The third and fourth embodiments can be applied even in a case where the ON mode signal Mon and the OFF mode signal Moff which are mode designation signals each are a single pulse. That is, the third and fourth embodiments can be applied even in a configuration in which a single pulse is used in each of cases of designating the ON mode or the OFF mode in order to switch the operating mode of the switching power supply 20. In this case, since the operating mode is likely to be influenced by disturbance noise, it is possible to further expect the effect of suppressing influence of disturbance noise according to the configurations of the third and fourth embodiments.

(3) In the above described embodiments, an example of the electric power system 100 in which an instruction for switching the mode of the switching power supply 20 is made by the power supply key SW1, and on the basis of that instruction, the ASIC 60 (system control unit) performs mode setting has been described. However, the present invention is not limited thereto. The present invention can be applied to an electric power system which does not include a power supply key and a system control unit.

(4) In the above described embodiments, an example in which the electric power system 100 which is disclosed in this specification has been applied to an image forming apparatus has been described. However, the present invention is not limited thereto. The electric power system 100 can be applied to various apparatuses to use the switching power supply 20 included in the electric power system 100 while switching the switching power supply 20 between the ON mode and the OFF mode.

According to the above configuration, in a case of designating the operating mode of the switching power supply by pulses, a consecutive-pulse signal in which pluses continue in a designation period is used. Therefore, for example, in a case where the consecutive-pulse signal is used to designate the OFF mode, even if noise or the like influences the mode designation terminal when the power cord of the electric power system is inserted into a socket, the noise is suppressed from causing the OFF mode to be designated. Therefore, when the electric power system starts up, the switching power supply is suppressed from becoming the OFF mode.

That is, since a consecutive-pulse signal is used as the mode designation signal, resistance to disturbance noise or the like which is input to the mode designation terminal is improved. Therefore, in the electric power system in which the oscillation operation of the switching power supply is switched by pluses, it is possible to suppress failures from being caused by disturbance noise.

According to the above configuration, it is possible to appropriately set a mode switching timing while suppressing malfunctions due to disturbance noise.

According to the above configuration, since a mode designation signal can be generated according to whether the consecutive-pulse signal is output or not, it is easy to generate a mode designation signal.

According to the above configuration, since the consecutive-pulse signal is used as the OFF mode designation signal, in the electric power system in which the oscillation operation of the switching power supply is switched by pluses, it is possible to suppress failures from being caused by disturbance noise.

According to the above configuration, when the storage unit contains the mode information representing the ON mode, even if oscillation of the switching power supply is stopped due to noise, it is possible to return the switching power supply to the oscillation state by the abnormal outputting process.

According to the above configuration, it is possible to accurately determine whether the switching power supply is in the normal state, on the basis of the value of the output voltage of the switching power supply.

According to the above configuration, it is possible to accurately determine whether the switching power supply is in the normal state, on the basis of the power supply information which is input from the power supply control unit.

According to the above configuration, even if noise is input to the power supply control unit when the switching power supply is in the ON mode, whereby the mode is switched such that oscillation stops, since the mode control unit determines that the switching power supply is in the abnormal state, and stores the mode information representing the OFF mode in the storage unit, it is possible to match the operating mode with the mode information stored in the storage unit.

In the above configuration, when the switching power supply has been set to the ON mode, if only the power supply control unit is switched to the OFF mode due to disturbance noise, whereby oscillation stops, the mode control unit maintains the ON mode and the system control unit stops operating. Therefore, it is feared a problem in which, since the system control unit cannot receive the press information and the OFF mode setting signal is not output from the system control unit to the mode control unit, the mode control unit cannot recognize that the switching power supply is in the OFF mode. However, according to the present disclosure, it is possible to suppress occurrence of such problem.

According to the preset disclosure, an image forming apparatus includes the electric power system having the above configuration, and an image forming unit that forms images using the DC voltage which is output from the switching power supply.

According to this configuration, in the image forming apparatus including the electric power system, it is possible to suppress failures from occurring in the electric power system due to disturbance noise. Therefore, it is suppressed that the image forming apparatus is not activated during start of use of the image forming apparatus.

According to the present disclosure, it is possible to suppress failures from being caused by disturbance noise in an electric power system in which an oscillation operation of a switching power supply is switched by a pulse.

What is claimed is:

1. An electric power system comprising:
a switching power supply configured to receive an AC voltage from an AC power supply, convert the AC voltage into a DC voltage, and output the DC voltage, the switching power supply being configured to operate in an operation mode including an on mode in which the switching power supply oscillates and an off mode in which the switching power supply does not oscillate;
a power supply control unit configured to be activated when electric power is supplied from the AC power supply to the power supply control unit, the power supply control unit including a mode designation terminal configured to receive a mode designation signal designating the operating mode of the switching power supply, and the power supply control unit being configured to control an oscillation operation of the switching power supply according to the mode designation signal;

a mode control unit configured to generate the mode designation signal; and an auxiliary power supply configured to supply electric power to the mode control unit when the switching power supply does not oscillate, wherein in a period of one of the on mode and the off mode, the mode control unit performs an outputting process of outputting, as the mode designation signal, a consecutive-pulse signal in which pulses continues in a predetermined cycle to the mode designation terminal of the power supply control unit, and wherein in the period of the other of the on mode and the off mode, the mode control unit performs a restriction process of restricting output of the consecutive-pulse signal.

2. The electric power system according to claim 1, wherein the power supply control unit includes:
 a timer configured to generate a time measurement signal for every predetermined cycle in response to input of the consecutive-pulse signal, and
 a counter configured to count a number of pulses in the predetermined cycle of the consecutive-pulse signal based on the time measurement signal, and
 when the count value of the counter reaches a predetermined value, the power supply control unit performs a validity determining process of determining that the mode designation signal is valid.

3. The electric power system according to claim 1, wherein in the restriction process, the mode control unit halts output of the consecutive-pulse signal.

4. The electric power system according to claim 1, wherein
 the mode control unit includes a storage unit configured to store mode information representing the operating mode of the switching power supply,
 in the outputting process, in a case where the storage unit contains mode information representing the off mode, the mode control unit outputs the consecutive-pulse signal designating the off mode, as the mode designation signal, to the mode designation terminal of the power supply control unit,
 in the restriction process, in a case where the storage unit contains mode information representing the on mode, the mode control unit restricts output of the consecutive-pulse signal designating the off mode to the power supply control unit,
 when the consecutive-pulse signal designating the off mode is not input, the power supply control unit performs an oscillation process of oscillating the switching power supply, and
 when the consecutive-pulse signal designating the off mode is input, the power supply control unit performs an oscillation stopping process of stopping oscillation of the switching power supply.

5. The electric power system according to claim 1, wherein the mode control unit includes a storage unit which stores
 mode information representing the operating mode of the switching power supply,
 in the restriction process, in a case where the storage unit contains mode information representing the off mode, the mode control unit restricts output of the consecutive-pulse signal designating the on mode to the power supply control unit,
 in the outputting process, in a case where the storage unit contains mode information representing the on mode, the mode control unit outputs the consecutive-pulse signal designating the on mode, as the mode designation signal, to the mode designation terminal of the power supply control unit, if the consecutive-pulse signal designating the on mode is input, the power supply control unit performs an oscillation process of oscillating the switching power supply, and if the consecutive-pulse signal designating the on mode is not input, the power supply control unit performs an oscillation stopping process of stopping oscillation of the switching power supply.

6. The electric power system according to claim 1, further comprising:
 a power supply key; and
 a system control unit configured to receive electric power from the switching power supply,
 wherein the mode control unit includes a storage unit configured to store mode information representing the operating mode of the switching power supply,
 wherein the mode control unit performs a press detecting process of detecting a press signal which is output from the power supply key when the power supply key is pressed,
 wherein in a case where the storage unit contains mode information representing the on mode, the mode control unit performs a press output process of outputting, to the system control unit, press information representing that the press signal has been detected when the press signal is detected,
 wherein the mode control unit performs an off mode storing process of storing mode information representing the off mode in the storage unit when an off mode setting signal is input from the system control unit,
 wherein the mode control unit performs an on mode storing process of storing mode information representing the on mode in the storage unit when an on mode setting signal is input from the system control unit,
 wherein the system control unit performs an off output process of outputting the off mode setting signal to the mode control unit when the press information is input from the mode control unit, and
 wherein the system control unit performs an on output process of outputting the on mode setting signal to the mode control unit when electric power is supplied from the switching power supply having started oscillation.

7. An image forming apparatus comprising:
 the electric power system according to claim 1; and
 an image forming unit configured to form an image using the DC voltage output from the switching power supply.

8. An electric power system comprising:
 a switching power supply configured to receive an AC voltage from an AC power supply, and convert the AC voltage into a DC voltage, and output the DC voltage, the switching power supply being configured to operate in an operation mode including an on mode in which the switching power supply oscillates and an off mode in which the switching power supply does not oscillate;
 a power supply control unit configured to be activated when electric power is supplied from the AC power supply to the power supply control unit, the power supply control unit including a mode designation terminal configured to receive a mode designation signal designating the operating mode of the switching power supply, and the power supply control unit being configured to control an oscillation operation of the switching power supply according to the mode designation signal;
 a mode control unit configured to generate the mode designation signal;

an auxiliary power supply configured to supply electric power to the mode control unit when the switching power supply does not oscillate;

a power supply information generating circuit configured to generate power supply information representing whether the switching power supply is oscillating or not; and a storage unit configured to store mode information representing the operating mode of the switching power supply, wherein in a case that the storage unit contains the mode information representing the on mode, the power supply information representing that the switching power supply is oscillating is generated, the mode control unit performs a determining process of determining that the switching power supply is in a normal state when the power supply information generating circuit generates the power supply information representing that the switching power supply is oscillating, wherein in the case that the storage unit contains the mode information representing the on mode, the mode control unit performs the determining process of determining that the switching power supply is in an abnormal state when the power supply information generating circuit generates the power supply information representing that the switching power supply is not oscillating, and wherein when the determining process determines that the switching power supply is in the abnormal state, the mode control unit performs an abnormal outputting process in which the mode designation signal designating the on mode is output as the mode designation signal to the mode designation terminal.

9. The electric power system according to claim 8, wherein the mode control unit includes the power supply information generating circuit configured to generate the power supply information by detecting an output voltage of the switching power supply, in the determining process, the mode control unit determines that the power supply information representing that the switching power supply is oscillating is generated and the switching power supply is in the normal state when the output voltage is equal to or larger than a predetermined value, and in the determining process, the mode control unit determines that the power supply information representing that the switching power supply is not oscillating is generated and the switching power supply is in the abnormal state when the output voltage is less than the predetermined value.

10. The electric power system according to claim 8, wherein the power supply control unit includes the power supply information generating circuit, in the determining process, the mode control unit determines that the switching power supply is in the normal state when the power supply information representing that the switching power supply is oscillating is input from the power supply control unit, and in the determining process, the mode control unit determines that the switching power supply is in the abnormal state when the power supply information representing that the switching power supply is not oscillating is input from the power supply control unit.

11. The electric power system according to claim 8, further comprising:

a power supply key; and a system control unit configured to receive electric power from the switching power supply, wherein the mode control unit performs a press detecting process of detecting a press signal which is output from the power supply key when the power supply key is pressed, wherein in a case where the storage unit contains mode information representing the on mode, the mode control unit performs a press output process of outputting, to the system control unit, press information representing that the press signal has been detected when the press signal is detected, wherein the mode control unit performs an off mode storing process of storing mode information representing the off mode in the storage unit when an off mode setting signal is input from the system control unit, wherein the mode control unit performs an on mode storing process of storing mode information representing the on mode in the storage unit when an on mode setting signal is input from the system control unit, wherein the system control unit performs an off output process of outputting the off mode setting signal to the mode control unit when the press information is input from the mode control unit, and wherein the system control unit performs an on output process of outputting the on mode setting signal to the mode control unit when electric power is supplied from the switching power supply having started oscillation.

12. An image forming apparatus comprising:

the electric power system according to claim 8; and an image forming unit configured to form an image using the DC voltage output from the switching power supply.

13. An electric power system comprising:

a switching power supply configured to receive an AC voltage from an AC power supply, and convert the AC voltage into a DC voltage, and output the DC voltage, the switching power supply being configured to operate in an operation mode including an on mode in which the switching power supply oscillates and an off mode in which the switching power supply does not oscillate;

a power supply control unit configured to be activated when electric power is supplied from the AC power supply to the power supply control unit, the power supply control unit including a mode designation terminal configured to receive a mode designation signal designating the operating mode of the switching power supply, and the power supply control unit being configured to control an oscillation operation of the switching power supply according to the mode designation signal;

a mode control unit configured to generate the mode designation signal;

an auxiliary power supply configured to supply electric power to the mode control unit when the switching power supply does not oscillate; and a storage unit configured to store mode information representing the operating mode of the switching power supply, wherein in a case where the switching power supply is oscillating, the power supply control unit performs a change notifying process of transmitting an off mode switch signal to the mode control unit when the designation signal designating the off mode is input as the mode designation signal to the mode designation terminal, and wherein the mode control unit performs an off mode storing process of storing mode information representing the off mode in the storage unit when the off mode switch signal is input.

14. The electric power system according to claim 13, further comprising:
- a power supply key; and
- a system control unit configured to receive electric power from the switching power supply,
- wherein the mode control unit performs a press detecting process of detecting a press signal which is output from the power supply key when the power supply key is pressed,
- wherein in a case where the storage unit contains mode information representing the on mode, the mode control unit performs a press output process of outputting, to the system control unit, press information representing that the press signal has been detected when the press signal is detected,
- wherein the mode control unit performs an off mode storing process of storing mode information representing the off mode in the storage unit when an off mode setting signal is input from the system control unit,
- wherein the mode control unit performs an on mode storing process of storing mode information representing the on mode in the storage unit when an on mode setting signal is input from the system control unit,
- wherein the system control unit performs an off output process of outputting the off mode setting signal to the mode control unit when the press information is input from the mode control unit, and
- wherein the system control unit performs an on output process of outputting the on mode setting signal to the mode control unit when electric power is supplied from the switching power supply having started oscillation.

15. An image forming apparatus comprising:
- the electric power system according to claim 13; and
- an image forming unit configured to form an image using the DC voltage output from the switching power supply.

* * * * *